US008683076B2

(12) United States Patent
Farber et al.

(10) Patent No.: US 8,683,076 B2
(45) Date of Patent: *Mar. 25, 2014

(54) METHOD OF GENERATING A WEB PAGE

(75) Inventors: David A. Farber, Ojai, CA (US);
Richard E. Greer, Red Lodge, MT (US); Andrew D. Swart, Pennington, NJ (US); James A. Balter, Santa Barbara, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 1103 days.

This patent is subject to a terminal disclaimer.

(21) Appl. No.: 11/806,152

(22) Filed: May 30, 2007

(65) Prior Publication Data
US 2007/0233705 A1     Oct. 4, 2007

Related U.S. Application Data

(60) Continuation of application No. 11/065,412, filed on Feb. 23, 2005, now Pat. No. 8,478,903, which is a continuation of application No. 09/612,598, filed on Jul. 7, 2000, now abandoned, which is a division of application No. 09/021,506, filed on Feb. 10, 1998, now Pat. No. 6,185,598, said application No. 11/806,152 is a continuation of application No. 11/441,253, filed on May 26, 2006, now Pat. No. 8,281,035, which is a continuation of application No. 11/065,412, filed on Mar. 23, 2005, now Pat. No. 8,478,903.

(51) Int. Cl.
*G06F 15/16* (2006.01)

(52) U.S. Cl.
USPC ............................ 709/245; 709/219; 709/225

(58) Field of Classification Search
USPC ........................................ 709/219, 226, 245
See application file for complete search history.

(56) References Cited

U.S. PATENT DOCUMENTS

| 4,495,570 A | 1/1985 | Kitajima et al. |
| 4,591,983 A | 5/1986 | Bennett et al. |
| 4,594,704 A | 6/1986 | Ollivier |
| 4,726,017 A | 2/1988 | Krum et al. |
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers |
| 4,922,417 A | 5/1990 | Churm et al. |

(Continued)

FOREIGN PATENT DOCUMENTS

| CA | 2202572 | 10/1998 |
| EP | 0801487 A2 | 10/1997 |

(Continued)

OTHER PUBLICATIONS

Complaint for Injunctive and Other Relief, filed Dec. 17, 2007 in Civil Action No. 2:07CV589.

(Continued)

*Primary Examiner* — Douglas Blair

(57) ABSTRACT

A method of generating a web page modifies uniform resource locators (URLs) of embedded resources in a web page. The modified URLs include data prepended to information from the original URLs. The prepended data may be a hostname or an network address that is resolvable to a shared network of servers.

19 Claims, 6 Drawing Sheets

(56) References Cited

U.S. PATENT DOCUMENTS

| | | | |
|---|---|---|---|
| 4,943,932 A | 7/1990 | Lark et al. | |
| 4,949,187 A | 8/1990 | Cohen | |
| 4,949,248 A | 8/1990 | Caro | |
| 5,029,232 A | 7/1991 | Nall | |
| 5,130,792 A | 7/1992 | Tindell et al. | |
| 5,132,992 A | 7/1992 | Yurt et al. | |
| 5,136,716 A | 8/1992 | Harvey et al. | |
| 5,172,413 A | 12/1992 | Bradley | |
| 5,191,573 A | 3/1993 | Hair | |
| 5,253,275 A | 10/1993 | Yurt et al. | |
| 5,253,341 A | 10/1993 | Rozmanith | |
| 5,287,499 A | 2/1994 | Nemes | |
| 5,287,537 A | 2/1994 | Newmark et al. | |
| 5,291,554 A | 3/1994 | Morales | |
| 5,341,477 A | 8/1994 | Pitkin et al. | |
| 5,371,532 A | 12/1994 | Gelman | |
| 5,410,343 A | 4/1995 | Coddington | |
| 5,414,455 A | 5/1995 | Hooper | |
| 5,442,389 A | 8/1995 | Blahut | |
| 5,442,390 A | 8/1995 | Hooper | |
| 5,442,749 A | 8/1995 | Northcutt | |
| 5,471,622 A | 11/1995 | Eadline | |
| 5,475,615 A | 12/1995 | Lin | |
| 5,508,732 A | 4/1996 | Bottomley | |
| 5,515,511 A | 5/1996 | Nguyen | |
| 5,519,435 A | 5/1996 | Anderson | |
| 5,522,070 A | 5/1996 | Sumimoto | |
| 5,528,281 A | 6/1996 | Grady | |
| 5,539,621 A | 7/1996 | Kikinis | |
| 5,542,087 A | 7/1996 | Neimat et al. | |
| 5,544,313 A | 8/1996 | Shachnai | |
| 5,544,327 A | 8/1996 | Dan | |
| 5,550,577 A | 8/1996 | Verbiest | |
| 5,550,863 A | 8/1996 | Yurt | |
| 5,550,982 A | 8/1996 | Long | |
| 5,557,317 A | 9/1996 | Nishio | |
| 5,572,643 A | 11/1996 | Judson | |
| 5,590,288 A | 12/1996 | Castor | |
| 5,592,611 A | 1/1997 | Midgely | |
| 5,594,910 A | 1/1997 | Filepp et al. | |
| 5,603,026 A | 2/1997 | Demers et al. | |
| 5,619,648 A | 4/1997 | Canale | |
| 5,623,656 A | 4/1997 | Lyons | |
| 5,625,781 A | 4/1997 | Cline | |
| 5,627,829 A | 5/1997 | Gleeson et al. | |
| 5,630,067 A | 5/1997 | Kindell | |
| 5,633,999 A | 5/1997 | Clowes | |
| 5,634,006 A | 5/1997 | Baugher et al. | |
| 5,638,443 A | 6/1997 | Stefik et al. | |
| 5,644,714 A | 7/1997 | Kikinis | |
| 5,646,676 A | 7/1997 | Dewkett et al. | |
| 5,649,186 A | 7/1997 | Ferguson | |
| 5,659,729 A | 8/1997 | Nielsen | |
| 5,666,362 A | 9/1997 | Chen | |
| 5,671,279 A | 9/1997 | Elgamai | |
| 5,675,734 A | 10/1997 | Hair | |
| 5,682,512 A | 10/1997 | Tetrick | |
| 5,699,513 A | 12/1997 | Feigen et al. | |
| 5,708,780 A | 1/1998 | Levergood et al. | |
| 5,712,979 A | 1/1998 | Graber et al. | |
| 5,715,453 A | 2/1998 | Stewart | |
| 5,721,914 A | 2/1998 | DeVries | |
| 5,734,831 A | 3/1998 | Sanders | |
| 5,740,423 A | 4/1998 | Logan et al. | |
| 5,742,762 A | 4/1998 | Scholl | |
| 5,751,961 A | 5/1998 | Smyk | |
| 5,761,507 A | 6/1998 | Govett | |
| 5,761,663 A | 6/1998 | Largarde et al. | |
| 5,764,906 A | 6/1998 | Edelstein et al. | |
| 5,774,660 A | 6/1998 | Brendel et al. | |
| 5,774,668 A | 6/1998 | Choquier et al. | |
| 5,777,988 A | 7/1998 | Cisneros | |
| 5,777,989 A | 7/1998 | McGarvey | |
| 5,778,187 A | 7/1998 | Monteiro et al. | |
| 5,784,058 A | 7/1998 | LaStrange et al. | |
| 5,794,253 A | 8/1998 | Norin et al. | |
| 5,796,952 A | 8/1998 | Davis | |
| 5,799,141 A | 8/1998 | Galipeau et al. | |
| 5,802,106 A | 9/1998 | Packer | |
| 5,802,291 A | 9/1998 | Balick et al. | |
| 5,812,769 A | 9/1998 | Graber et al. | |
| 5,815,664 A | 9/1998 | Asano | |
| 5,819,092 A * | 10/1998 | Ferguson et al. | 717/113 |
| 5,826,031 A | 10/1998 | Nielsen | |
| 5,828,847 A | 10/1998 | Gehr | |
| 5,832,506 A | 11/1998 | Kuzma | |
| 5,832,514 A | 11/1998 | Norin et al. | |
| 5,835,718 A | 11/1998 | Blewett | |
| 5,838,906 A | 11/1998 | Doyle et al. | |
| 5,845,303 A | 12/1998 | Templeman | |
| 5,856,974 A | 1/1999 | Gervais et al. | |
| 5,862,339 A | 1/1999 | Bonnaure | |
| 5,867,706 A * | 2/1999 | Martin et al. | 718/105 |
| 5,867,799 A | 2/1999 | Lang et al. | |
| 5,870,546 A | 2/1999 | Kirsch | |
| 5,870,559 A | 2/1999 | Leshem et al. | |
| 5,878,212 A | 3/1999 | Civanlar et al. | |
| 5,884,038 A | 3/1999 | Kapoor | |
| 5,890,171 A | 3/1999 | Blumer et al. | |
| 5,893,116 A | 4/1999 | Simmonds et al. | |
| 5,894,554 A | 4/1999 | Lowery et al. | |
| 5,896,533 A | 4/1999 | Ramos et al. | |
| 5,903,723 A | 5/1999 | Beck et al. | |
| 5,907,704 A | 5/1999 | Gudmundson et al. | |
| 5,913,028 A | 6/1999 | Wang et al. | |
| 5,913,033 A | 6/1999 | Grout | |
| 5,918,010 A | 6/1999 | Appleman et al. | |
| 5,919,247 A | 7/1999 | Van Hoff et al. | |
| 5,920,701 A | 7/1999 | Miller et al. | |
| 5,925,106 A | 7/1999 | Nielsen | |
| 5,931,904 A | 8/1999 | Banga | |
| 5,933,832 A | 8/1999 | Suzuoka et al. | |
| 5,935,207 A | 8/1999 | Logue et al. | |
| 5,940,831 A | 8/1999 | Takano | |
| 5,944,780 A | 8/1999 | Chase | |
| 5,945,989 A | 8/1999 | Freishtat et al. | |
| 5,956,489 A | 9/1999 | San Andres et al. | |
| 5,956,716 A | 9/1999 | Kenner | |
| 5,958,008 A | 9/1999 | Pogrebisky et al. | |
| 5,961,596 A | 10/1999 | Takubo et al. | |
| 5,966,440 A | 10/1999 | Hair | |
| 5,968,121 A | 10/1999 | Logan et al. | |
| 5,973,696 A | 10/1999 | Agranat et al. | |
| 5,978,791 A | 11/1999 | Farber et al. | |
| 5,983,005 A | 11/1999 | Monteiro et al. | |
| 5,983,214 A | 11/1999 | Lang et al. | |
| 5,983,227 A | 11/1999 | Nazem et al. | |
| 5,987,606 A | 11/1999 | Cirasole et al. | |
| 5,991,809 A | 11/1999 | Kriegsman | |
| 5,996,025 A | 11/1999 | Day | |
| 6,002,720 A | 12/1999 | Yurt et al. | |
| 6,003,030 A | 12/1999 | Kenner et al. | |
| 6,006,264 A | 12/1999 | Colby et al. | |
| 6,012,090 A | 1/2000 | Chung et al. | |
| 6,014,686 A | 1/2000 | Elnozahy et al. | |
| 6,014,698 A | 1/2000 | Griffiths | |
| 6,018,516 A | 1/2000 | Packer | |
| 6,021,426 A | 2/2000 | Douglis | |
| 6,026,440 A | 2/2000 | Shrader et al. | |
| 6,029,175 A | 2/2000 | Chow et al. | |
| 6,029,176 A | 2/2000 | Cannon | |
| 6,035,332 A | 3/2000 | Ingrassia, Jr. et al. | |
| 6,038,216 A | 3/2000 | Packer | |
| 6,038,310 A | 3/2000 | Hollywood et al. | |
| 6,038,610 A | 3/2000 | Belfiore et al. | |
| 6,041,307 A | 3/2000 | Ahuja et al. | |
| 6,041,324 A | 3/2000 | Earl et al. | |
| 6,044,405 A | 3/2000 | Driscoll, III et al. | |
| 6,046,980 A | 4/2000 | Packer | |
| 6,049,831 A | 4/2000 | Gardell et al. | |
| 6,052,718 A | 4/2000 | Gifford | |
| 6,052,730 A | 4/2000 | Felciano et al. | |
| 6,061,738 A | 5/2000 | Osaku et al. | |
| 6,065,051 A | 5/2000 | Steele et al. | |

(56) References Cited

U.S. PATENT DOCUMENTS

| | | | |
|---|---|---|---|
| 6,065,062 A | 5/2000 | Periasamy et al. | |
| 6,070,191 A | 5/2000 | Narendran et al. | |
| 6,078,943 A | 6/2000 | Yu | |
| 6,081,829 A | 6/2000 | Sidana | |
| 6,081,835 A | 6/2000 | Antcliff | |
| 6,085,193 A * | 7/2000 | Malkin et al. | 1/1 |
| 6,092,112 A | 7/2000 | Fukushige | |
| 6,092,204 A | 7/2000 | Baker | |
| 6,094,680 A | 7/2000 | Hokanson | |
| 6,098,078 A | 8/2000 | Gehani | |
| 6,105,028 A | 8/2000 | Sullivan et al. | |
| 6,108,673 A | 8/2000 | Brandt et al. | |
| 6,108,703 A | 8/2000 | Leighton et al. | |
| 6,112,231 A | 8/2000 | DeSimone et al. | |
| 6,112,239 A | 8/2000 | Kenner et al. | |
| 6,112,240 A | 8/2000 | Pogue et al. | |
| 6,115,357 A | 9/2000 | Packer et al. | |
| 6,115,752 A | 9/2000 | Chauhan | |
| 6,119,143 A | 9/2000 | Dias et al. | |
| 6,119,163 A | 9/2000 | Monteiro et al. | |
| 6,125,388 A | 9/2000 | Reisman | |
| 6,125,394 A | 9/2000 | Rabinovich | |
| 6,128,601 A | 10/2000 | Van Horne et al. | |
| 6,128,660 A | 10/2000 | Grimm et al. | |
| 6,134,583 A | 10/2000 | Herriot | |
| 6,144,375 A | 11/2000 | Jain et al. | |
| 6,144,702 A | 11/2000 | Yurt et al. | |
| 6,144,996 A | 11/2000 | Starnes et al. | |
| 6,151,624 A | 11/2000 | Teare et al. | |
| 6,154,738 A | 11/2000 | Call | |
| 6,154,744 A | 11/2000 | Kenner et al. | |
| 6,154,753 A | 11/2000 | McFarland | |
| 6,154,777 A | 11/2000 | Ebrahim | |
| 6,163,779 A | 12/2000 | Mantha et al. | |
| 6,167,427 A | 12/2000 | Rabinovich et al. | |
| 6,173,311 B1 | 1/2001 | Hassett et al. | |
| 6,173,322 B1 | 1/2001 | Hu | |
| 6,178,160 B1 | 1/2001 | Bolton et al. | |
| 6,181,690 B1 | 1/2001 | Civanlar | |
| 6,181,867 B1 | 1/2001 | Kenner et al. | |
| 6,185,598 B1 | 2/2001 | Farber | |
| 6,185,619 B1 | 2/2001 | Joffe et al. | |
| 6,189,030 B1 | 2/2001 | Kirsch et al. | |
| 6,189,039 B1 | 2/2001 | Harvey | |
| 6,195,680 B1 | 2/2001 | Goldszmidt | |
| 6,222,856 B1 | 4/2001 | Krishnan et al. | |
| 6,226,618 B1 | 5/2001 | Downs | |
| 6,226,642 B1 | 5/2001 | Beranek et al. | |
| 6,230,196 B1 * | 5/2001 | Guenthner et al. | 709/223 |
| 6,243,760 B1 * | 6/2001 | Armbruster et al. | 709/243 |
| 6,256,675 B1 | 7/2001 | Rabinovich | |
| 6,263,313 B1 | 7/2001 | Milsted | |
| 6,266,699 B1 | 7/2001 | Sevcik | |
| 6,269,394 B1 | 7/2001 | Kenner et al. | |
| 6,272,566 B1 | 8/2001 | Craft | |
| 6,282,569 B1 | 8/2001 | Wallis et al. | |
| 6,282,574 B1 | 8/2001 | Voit | |
| 6,286,045 B1 | 9/2001 | Griffiths et al. | |
| 6,292,905 B1 | 9/2001 | Wallach et al. | |
| 6,298,041 B1 | 10/2001 | Packer | |
| 6,311,214 B1 | 10/2001 | Rhoads | |
| 6,314,565 B1 | 11/2001 | Kenner et al. | |
| 6,324,580 B1 | 11/2001 | Jindal | |
| 6,327,622 B1 | 12/2001 | Jindal et al. | |
| 6,330,602 B1 | 12/2001 | Law et al. | |
| 6,332,195 B1 | 12/2001 | Green et al. | |
| 6,347,085 B2 | 2/2002 | Kelly | |
| 6,351,775 B1 | 2/2002 | Yu | |
| 6,360,256 B1 | 3/2002 | Lim | |
| 6,360,262 B1 | 3/2002 | Guenthner et al. | |
| 6,370,571 B1 | 4/2002 | Medin, Jr. | |
| 6,370,580 B2 | 4/2002 | Kriegsman | |
| 6,398,245 B1 | 6/2002 | Gruse | |
| 6,412,000 B1 | 6/2002 | Riddle et al. | |
| 6,415,280 B1 | 7/2002 | Farber et al. | |
| 6,418,421 B1 | 7/2002 | Hurtado | |
| 6,418,461 B1 | 7/2002 | Barnhouse et al. | |
| 6,421,726 B1 | 7/2002 | Kenner et al. | |
| 6,424,992 B2 | 7/2002 | Devarakonda et al. | |
| 6,425,005 B1 | 7/2002 | Dugan et al. | |
| 6,434,622 B1 | 8/2002 | Monteiro et al. | |
| 6,442,549 B1 | 8/2002 | Schneider | |
| 6,452,925 B1 | 9/2002 | Sistanizadeh et al. | |
| 6,456,630 B1 | 9/2002 | Packer et al. | |
| 6,460,082 B1 | 10/2002 | Lumelsky | |
| 6,463,454 B1 | 10/2002 | Lumelsky | |
| 6,463,508 B1 | 10/2002 | Wolf | |
| 6,470,389 B1 | 10/2002 | Chung et al. | |
| 6,480,893 B2 | 11/2002 | Kriegsman | |
| 6,484,204 B1 | 11/2002 | Rabinovich | |
| 6,496,856 B1 | 12/2002 | Kenner et al. | |
| 6,502,125 B1 | 12/2002 | Kenner et al. | |
| 6,502,215 B2 | 12/2002 | Raad et al. | |
| 6,557,054 B2 | 4/2003 | Reisman | |
| 6,581,090 B1 | 6/2003 | Lindbo et al. | |
| 6,587,837 B1 | 7/2003 | Spagna | |
| 6,591,299 B2 | 7/2003 | Riddle et al. | |
| 6,611,862 B2 | 8/2003 | Reisman | |
| 6,654,807 B2 | 11/2003 | Farber et al. | |
| 6,658,464 B2 | 12/2003 | Reisman | |
| 6,665,706 B2 | 12/2003 | Kenner et al. | |
| 6,741,563 B2 | 5/2004 | Packer | |
| 6,763,377 B1 | 7/2004 | Belknap et al. | |
| 6,779,031 B1 | 8/2004 | Picher-Dempsey | |
| 6,785,704 B1 | 8/2004 | McCanne | |
| 6,799,221 B1 | 9/2004 | Kenner et al. | |
| 6,859,791 B1 | 2/2005 | Spagna | |
| 6,915,329 B2 | 7/2005 | Kriegsman | |
| 6,928,442 B2 | 8/2005 | Farber et al. | |
| 6,944,676 B1 | 9/2005 | Armbruster et al. | |
| 6,963,910 B1 | 11/2005 | Belknap | |
| 6,973,485 B2 | 12/2005 | Ebata et al. | |
| 7,047,300 B1 | 5/2006 | Oehrke et al. | |
| 7,061,923 B2 | 6/2006 | Dugan et al. | |
| 7,080,153 B2 | 7/2006 | Monteiro et al. | |
| 7,103,564 B1 | 9/2006 | Ehnebuske | |
| 7,110,984 B1 | 9/2006 | Spagna | |
| 7,117,259 B1 | 10/2006 | Rohwer | |
| 7,188,085 B2 | 3/2007 | Pelletier | |
| 7,206,748 B1 | 4/2007 | Gruse | |
| 7,254,645 B2 | 8/2007 | Nishi | |
| 7,266,686 B1 | 9/2007 | Monteiro et al. | |
| 7,600,120 B2 | 10/2009 | Monteiro et al. | |
| 7,697,415 B2 | 4/2010 | Dugan et al. | |
| 2001/0052024 A1 | 12/2001 | Devarakonda | |
| 2002/0078233 A1 | 6/2002 | Biliris | |
| 2003/0149581 A1 | 8/2003 | Chaudhri | |
| 2004/0139097 A1 | 7/2004 | Farber et al. | |
| 2005/0038851 A1 | 2/2005 | Kriegsman | |
| 2005/0114296 A1 | 5/2005 | Farber et al. | |

FOREIGN PATENT DOCUMENTS

| | | |
|---|---|---|
| EP | 0817444 | 1/1998 |
| EP | 0824236 A2 | 2/1998 |
| EP | 0865180 A2 | 9/1998 |
| GB | 2 281 793 | 3/1995 |
| JP | 05162529 | 6/1993 |
| JP | 7066829 | 3/1995 |
| JP | 08-044643 | 2/1996 |
| JP | 08328583 | 9/1996 |
| JP | 10-027148 | 1/1998 |
| WO | WO 96/42041 | 12/1996 |
| WO | WO 97/11429 | 3/1997 |
| WO | WO 97/29423 | 8/1997 |
| WO | WO 98/04985 | 2/1998 |
| WO | WO 98/06033 | 2/1998 |

OTHER PUBLICATIONS

Report on the Filing or Determination of an Action Regarding a Patent or Trademark, dated Dec. 28, 2007, in connection with Civil Action No. 2:07CV589 filed Dec. 17, 2007.

(56) References Cited

OTHER PUBLICATIONS

Rule 7.1 Financial Interest Disclosure Statement filed Dec. 17, 2007 in Civil Action No. 2:07CV589.
Awerbuch, B. et al., Distributed Paging for General Networks. In Proc. of the 7th ACM-SIAM Symposium on Discrete Algorithms, pp. 574-583, Jan. 1996.
Baentsch, M, et al. "Enhancing the Web's Infrastructure: From Caching to Replication." IEEE Internet Computing, 1(2): Mar. 18-27, 1997.
Gadde, S., et al., "Reduce, reuse, recycle: An approach to building large internet caches," in Workshop on Hot Topics in Operating Systems (HotOS), Apr. 1997.
Korkea-aho, M. (1995). Scalability in Distributed Multimedia Systems, Technical report TKO-B128, Helsinki University of Technology.
Naor, Moni, et al., "The Load, Capacity and Availability of Quorum Systems", In Proceedings of the 35th IEEE Symposium on Foundations of Computer Science, (Nov. 1994), 214-225.
Pultar, Giray; "USENIX, Automatically Selecting a Close Mirror Based on Network Topology," Proceedings of the Twelfth Systems Administration Conference; Boston, Massachusetts, Dec. 1998, p. 159-166.
Ravi, R., "Rapid Rumor Ramification: Approximating the Minimum Broadcast Time", In Proceedings of teh 35th IEEE Symposium on Foundation of Computer Science, (Nov. 1994), 202-213.
Schmidt, J., et al., "Chernoff-Hoeffding Bounds for Applications with Limited Independence", in Proc. 4th ACM-SIAM Symp. on Discrete Algorithms, (1993), 331-340.
Wegman, Mark, et al., "New Hash Functions and Their Use in Authentication and Set Equality", Journal of Computer and System Sciences, vol. 22, (Jun. 1981), 265-279.
"Cisco Takes Global Route", PC Week News, (Feb. 17, 1997), p. 23.
"Exporting Web Server Final Report," http://www.cs.technion.ac.il/Labs/Lccn/projects/spring97/project4/final_report.html, Spring 1997 (downloaded Jul. 7, 2007).
"Global IP/PX Service Should Keep Network Delays Down", Infoworld, (Jan. 20, 1997), 1 page.
"Local Area Network Server Replacement Procedure", IBM Technical Disclosure Bulletin, vol. 38, No. 1, (Jan. 1995), 235-236.
"Patent Abstracts of Japan, Electronic Mail Multiplexing System and Communication Control Method in the System" (Appln. No. JP19930162529), (Jun. 30, 1993) (Pub. No. JP 7066829).
"Patent Abstracts of Japan, Method and Device for Repeating and Converting Information", (Appln. No. JP19960328583) (Pub. No. JP10171727), Jun. 26, 1998.
Adler, R. M., "Distributed Coordination Models for Client/Server Computing," Computer 28, 4 (Apr. 1995), 14-22.
Andresen et al., "SWEB: Towards a Scalable World Wide Web Server on Multicomputers", Proc. IPPS, (Apr. 15, 1996), 850-856.
Andresen, D., et al., Multiprocessor scheduling with client resources to improve the response time of WWW applications, Proc. 11th Int'l Conf. on Supercomputing (Austria, Jul. 1997). ICS '97. ACM Press, NY, NY, 92-99.
Basturk, E., et al., "Using network layer anycast for load distribution in the Internet," Tech. Rep., IBM T.J. Watson Research Center, 1997 (21 pgs.).
Berners-Lee et al., RFC 1738—Uniform Resource Locators, Dec. 1994.
Bestavros, A., "Speculative Data Dissemination and Service to Reduce Server Load, Network Traffic and Service Time in Distributed Information Systems", In Proc. ICDE '96: The 1996 Int'l Conf. on Data Engineering, (Mar. 1996), 4 pages.
Bestavros, et al., "Server-Initiated Document Dissemination for the WWW," IEEE Data Engineering Bulletin 19(3):3-11, Sep. 1996.
Bhattacharjee et al., "Application-layer anycasting," in Proc. IEEE INFOCOM '97, 1997.
Braun, H., et al., "Web traffic characterization: an assessment of the impact of caching documents from NCSA's web server," Comput. Netw. ISDN Syst. 28, 1-2 (Dec. 1995), 37-51.
Brisco, T. P. RFC 1794: DNS support for load balancing, Apr. 1995.
Carter et al., "Dynamic server selection using bandwidth probing in wide-area networks," Tech. Rep. BU-CS-96-007, Comp. Sci. Dept., Boston University, Mar. 1996.
Carter et al., Server selection using dynamic path characterization in Wide-Area Networks, IEEE INFOCOM '97, 1997 (pp. 1014-1021).
Carter, J. Lawrence et al., "Universal Classes of Hash Functions", Journal of Computer and System Sciences, vol. 18, No. 2, (Apr. 1979), 143-154.
Chankhunthod, A. et al., "A Hierarchical Internet Object Cache", Proc. of the 1996 USENIX Technical Conf., Jan. 1996, pp. 153-163.
Cisco Systems Inc., Cisco Distributed Director, pp. 1-15, http://www.cisco.com/warp/public/751/distdir/dd_wp.htm, 1997.
Cisco Systems, Inc., "Cache Director System", http://www.cisco.com/warp/public/751/cache/cdsov.htm, (1997), 1-5.
Cisco Systems, Inc., "Cache Director Systems Technology Overview", http://www.cisco.com/warp/public/751/cache/cds_ds.htm, (1997), 1-3.
Cisco Systems, Inc., "Cisco Cache Engine", http://www.cisco.com/warp/public/751/cache/index.html.
Cisco Systems, Inc., "Cisco Introduces Web Cache Product for Scaling The Internet", http://www.cisco.com/warp/public/146/1947.html, (1996), 1-2.
Cisco Systems, Inc., "Cisco Systems Ships Cisco LocalDirector to Meet Demands of High-Volume Web Traffic," 1996, pp. 1-2, http://www.cisco.com/warp/public/146/323.html.
Cisco Systems, Inc., "Excite Chooses Cisco Local Director to Support its Growing Service", http://www.cisco.com/warp/public/146/1857.html, (1997), 1-2.
Cisco Systems, Inc., "How to Cost-Effectively Scale Web Servers", http://www.cisco.com/warp/public/784//5.html, (1996), 1-5.
Cisco Systems, Inc., "Local Director", http://www.cisco.com/warp/public/751/lodir/index.html, 2 pages.
Cisco Systems, Inc., "Local Director", pp. 1-3.
Cisco Systems, Inc., "Scaling the Internet News Service", http://www.cisco.com/warp/public/751/lodir/news wp.htm, (1997), 1-11.
Cisco Systems, Inc., "Scaling the World Wide Web", http://www.cisco.com/warp/public/751/lodir/swww wp.html, (1996), 1-7.
Cisco Systems, Inc., Cisco DistributedDirector 2500 Series Installation and Configuration Guide, pp. xix-xxii; 1-1 to 1-12; 6-1 to 6-18; 7-1 to 7-18; 8-1 to 8-24, pub. date unknown, downloaded Apr. 2007: http://www.cisco.com/univercd/cc/td/doc/product/iaabu/distrdir/dd2501/.
Cisco Systems, Inc., Cisco DistributedDirector 4700-M Installation and Configuration Guide, pp. xix-xxii; 1-1 to 1-14; 7-1 to 7-18, 8-1 to 8-20; pub. date unknown, [downloaded Apr. 2007 from http://www.cisco.com/univercd/cc/td/doc/product/iaabu/distrdir/dd4700m/].
Cisco Systems, Inc., http://www.cisco.com/warp/public/751/disttdir/ddwp.htm, (1997), 1-4.
Cisco Systems, Inc., http://www.cisco.com/warp/public/751/lodir/lodir ds.htm, (1997), 1-4.
Cohen, J., et al., "Cache Array Routing Protocol v1.1", Sep. 29, 1997; http://tools.ietf.org/id/draft-vinod-carp-v1-01.txt (Last-Modified: Wed, Oct. 1, 1997).
Colajanni, M. and Yu, P. S. 1997. Adaptive TTL schemes for load balancing of distributed Web servers. SIGMETRICS Perform. Eval. Rev. 25, 2 (Sep. 1997), 36-42.
Communication (1 page) and European Search Report for Application No. EP 00 12 8346 (3 pages), (Mailed Aug. 24, 2001).
Cormen, T. H., et al., "Introduction to Algorithms", The MIT Press, Cambridge, Massachusetts, (1994), 219-243, 991-993.
Crovella et al., Dynamic server selection in the Internet, 3rd IEEE Workshop on the Arch. and Implementation of HighiPerformance Computer Sys. '95, pp. 158-162, Aug. 1995.
Danzig, P. B., et al., "An analysis of wide-area name server traffic: a study of the Internet Domain Name System," Conf. Proc. Communications Architectures & Protocols (Aug. 1992). D. Oran, Ed. SIGCOMM '92. ACM Press, New York, NY, 281-292.
De Bra, P.M.E., et al., "Information Retrieval in the World Wide Web: Making Client-Based Searching Feasible", Computer Networks and ISDN Systems, NL, North Holland Publishing, Amsterdam, vol. 27, No. 2, ISSN: 0169-7552, (Nov. 1, 1994), 183-192.

(56) References Cited

OTHER PUBLICATIONS

Deering, S. E., et al, "Multicast routing in datagram internetworks and extended LANs," ACM Trans. Comput. Syst. 8, 2 (May 1990), 85-110.
Devine, R., "Design and Implementation of DDH: A Distributed Dynamic Hashing Algorithm", In Proc. 4th Int'l Conf. on Foundations of Data Organizations and Algorithms, (1993), 101-114.
Doi, K. "Super Proxy Script—How to make distributed proxy servers by URL hashing," Sharp Corp., http://naragw.sharp.co.jp/sps/, dates unknown (1996-2000), download Jul. 7, 2007.
Feeley, M., et al., "Implementing Global Memory Management in a Workstation Cluster", In Proc. 15th ACM Symp. on Operating Systems Principles, (1995), 201-212.
Floyd, S., et al., "A Reliable Multicast Framework for Light-Weight Sessions and Application Level Framing", In Proc. of ACM SIGCOMM '95, 342-356, Aug. 1995.
Fox, A., "A Framework for Separating Server Scalability and Availability from Internet Application Functionality," PhD thesis, University of California, Berkeley, 1998.
Fox, A., et al,, "Cluster-based scalable network services", Proc. 16th ACM Symp. on Operating Systems Principles (Saint Malo, France, Oct. 5-8, 1997). W. M. Waite, Ed. SOSP '97. ACM Press, New York, NY, 78-91.
Fredman, M., et al., "Storing a Sparse Table with 0(1) Worst Case Access Time", J. ACM, vol. 31, No. 3, (Jul. 1984), 538-544.
Goldszmidt, et al., "Load Distribution for Scalable Web Servers: Summer Olympics 1996—A Case Study," In Proc. 8th IFIP/IEEE Int'l Workshop on Distributed Systems: Operations and Management, Sydney, Australia, Oct. 1997.
Grigni, M., et al., "Tight Bounds on Minimum Broadcasts Networks", SIAM J. Disc. Math. 4 (1991), 207-222.
Gulbrandsen, A., et al., "A DNS RR for specifying the location of services (DNS SRV)", Network Working Group, RFC 2052, Oct. 1996.
Guyton et al., "Locating nearby copies of replicated Internet servers," Proc. ACM SIGCOMM '95, pp. 288-298, 1995.
Gwertzman, J., et al., "The Case for Geographical Push-Caching", Proc. Workshop on Hot OS '95, (May 4, 1995), 51-55.
Gwertzman, J., et al., "World-Wide Web Cache Consistency", Proc. 1996 USENIX Tech. Conf., pp. 141-151, San Diego, CA, Jan. 1996.
International Search Report dated Jun. 8, 1999 for PCT/US99/01477.
Jeffrey et al., Proxy-Sharing Proxy Servers, IEEE, pp. 116-119, 1996.
Karger, D., et al., "Consistent Hashing and Random Trees: Distributed Caching Protocols for Relieving Hot Spots on the World Wide Web", in Proc. 29th Annual ACM Symp. on Theory of Computing, (May 1997), 654-663.
Kwan et al., NCSA's World Wide Web Server: Design and Performance, IEEE, pp. 68-74, Nov. 1995.
Litwin, W., et al., "LH*-A Scalable, Distributed Data Structure", ACM Trans. on Database Systems, vol. 21, No. 4, pp. 480-525, 1996.
Luotonen et al., World-Wide Web Proxies, CERN, Apr. 1994 (modified May 24, 1994).
Malpani, R., et al., "Making World Wide Web Caching Servers Cooperate", in Proc. 4th Int'l. World Wide Web Conf. (Dec. 1995), 10 pages (downloaded from http://www.w3.org/Conferences/WWW4/Papers/59/ on Jul. 7, 2007).
Mockapetris et al., "Development of the Domain Name System," Proc. SIGCOMM '88 Computer Communications Review, vol. 18, No. 4, Aug. 1988.
Mockapetris, P., RFC 1034: Domain Names—Concepts and Facilities, Nov. 1987.
Mockapetris, P., RFC 1035: Domain Names—Implementation and Specification, Nov. 1987.
Mourad et al., "Scalable Web Server Architectures," iscc, 2nd IEEE Symposium on Computers and Communications (ISCC '97), 1997, pp. 12-16.
Nisan, N. 1990. Pseudorandom generators for space-bounded computations. In Proc. 22nd Annual ACM Symp. on theory of Computing (Baltimore, MD, U.S., May 13-17, 1990). H. Ortiz, Ed. STOC '90. ACM Press, New York, NY, 204-212.

Oguchi et al., A Study of Caching Proxy Mechanisms Realized on Wide Area Distributed Networks, High Performance Distributed Computing, 5th Int'l Symposium, pp. 443-449, 1996.
Palmer, M., et al., "Fido: A Cache that Learns to Fetch", In Proc. the 17th Int'l Conf. on Very Large Data Bases, (Sep. 1991), 255-264.
Panigrahy, R., "Relieving Hot Spots on the World Wide Web", Master's thesis, MIT EECS, Jun. 1997, pp. 1-66.
Peleg D., et al., "The Availability of Quorum Systems," Tech. Rep. CS93-17, The Weizmann Institute of Science, Rehovot, Israel, 1993.
Peleg, D., et al., "The Availability of Quorum Systems", Information and Computation, 123, (1995), 210-223.
Petri S., et al., "Load Balancing and Fault Tolerance in Workstation Clusters. Migrating Groups of Communicating Processes.", Operating Systems Review, vol. 29, No. 4, Oct. 1995, pp. 25-36.
Plaxton, G. C., et al., "Fast Fault-Tolerant Concurrent Access to Shared Objects", In Proc. 37th IEEE Symp. of Foundations of Computer Science, (1996), 570-579.
Postel, RFC 1591—Domain Name System Structure and Delegation, Mar. 1994.
Rabin, M. O., 1989, "Efficient dispersal of information for security, load balancing, and fault tolerance," J. ACM 36, 2 (Apr. 1989), 335-348.
Ross, K.W., "Hash-Routing for Collections of Shared Web Caches", IEEE Network Magazine, 11, 7:37-44, Nov.-Dec. 1997.
Schemers, R., "Ibnamed—A load balancing name server written in Perl," 1995 LISA IX—Sep. 17-22, 1995—Monterey, CA.
Schuba, Christoph; "Addressing Weaknesses in the Domain Name System Protocol," COAST Laboratory, Dept. of Computer Sciences, Purdue University; West Layfayette, IN; Aug. 1993, p. 1-87.
Smith, "What can Archives offer the World Wide Web?", Technical Report 11, University of Kent, Computing Laboratory, University of Kent, Canterbury, UK, 1994.
Tarjan, Robert E., et al., "Storing a Sparse Table", Commun.ACM, 22, 11, (Nov. 1979), 606-611.
Thaler, D. G. and Ravishankar, C. V. 1998. Using name-based mappings to increase hit rates. IEEE/ACM Trans. Netw. 6, 1 (Feb. 1998), 1-14.
Vitter, J. S., et al., "Optimal Prefetching via Data Compression," Proc. 32nd Annual IEEE Symposium on Foundations of Computer Science (Oct. 1991).
Vixie, Paul; "Name Server Operations Guide for BIND," Internet Software Consortium; La Honda, CA; p. SMM:10-2-SMM:10-30 (undated, 1996).
Wessels, Intelligent Caching for World-Wide Web Objects, Masters Thesis, University of Colorado, 1995.
Yao, A. C. 1981. Should Tables Be Sorted?. J. ACM 28, 3 (Jul. 1981), 615-628.
"Opinion and Order," (Markman—claim construction Order), U.S. Dist. Judge Mark S. Davis, Dec. 10, 2008 in Civil Action No. 2:07cv589 (WDK-FBS), in US District Court, Norfolk, VA. [51 pgs.].
Answer of Defendant Limelight Networks, Inc. in Civil Action No. 2:07cv589 (WDK-FBS) (E.D. Va.) Feb. 1, 2008 [14 pgs.].
Answering Report of Scott Bradner Pursuant to Fed. R. Civ. 26 (a)(2)(B) Concerning the Validity of U.S. Patent Nos. 7,054,935 and 6,654,807, in Civil Action No. 2:07CV589 (RGD-FBS) (E.D. Va.), Aug. 25, 2008 [83 pgs.].
Defendant Limelight Networks, Inc.'s Reply Brief in Support of Its Motion for Summary Judgment of Non-Infringement and Invalidity of All Patents-In-Suit, in Civil File No. 2:07CV589 (E.D. Va.), Oct. 1, 2008 [21 pgs.].
Defendant Limelight Networks, Inc.s Claim Construction Brief for U.S. Patent Nos. 6,654,807; 7,054,935; and 6,473,405, in Civil Action No. 2:07cv589 (RGD-FBS) (E.D. Va.), Jun. 27, 2008 [38 pgs. + exhibits].
Deposition of Andrew D. Swart, Sep. 5, 2008, in Civil Action No. 2:07cv589 (WDK-FBS) (E.D. Va.), Exhibit 205, doc. titled "Leapfrog Project Overview," Andrew Swart, Aug. 29, 1996 [2 pgs.].
Deposition of Andrew D. Swart, Sep. 5, 2008, in Civil Action No. 2:07cv589 (WDK-FBS) (E.D. Va.), Exhibit 206, doc. titled "Leapfrog Management Meeting Agenda," Oct. 1, 1996 [1 pg.].

(56) References Cited

OTHER PUBLICATIONS

Deposition of Andrew D. Swart, Sep. 5, 2008, in Civil Action No. 2:07cv589 (WDK-FBS) (E.D. Va.), Exhibit 207, letter from Andrew D. Swart, Sandpiper Networks to Jean-Claude Asscher, Feb. 25, 1997 [2 pgs.].
Deposition of Andrew D. Swart, Sep. 5, 2008, in Civil Action No. 2:07cv589 (WDK-FBS) (E.D. Va.), Exhibit 209, email from David A. Farber sent Apr. 19, 1999 [5 pgs.].
Deposition of Andrew D. Swart, Sep. 5, 2008, in Civil Action No. 2:07cv589 (WDK-FBS) (E.D. Va.), Exhibit 210, email from Andrew Swart sent Apr. 24, 1999 [2 pgs.].
Deposition of Andrew D. Swart, Sep. 5, 2008, in Civil Action No. 2:07cv589 (WDK-FBS) (E.D. Va.), Exhibit 211, email from Will Crowder sent May 6, 1999 [10 pgs.].
Deposition of Andrew D. Swart, Sep. 5, 2008, in Civil Action No. 2:07cv589 (WDK-FBS) (E.D. Va.), Exhibit 212, email from Rick Greer sent Sep. 20, 1999 [11 pgs.].
Deposition of Andrew D. Swart, Sep. 5, 2008, in Civil Action No. 2:07cv589 (WDK-FBS) (E.D. Va.), Exhibit 213, email from Mike Warren sent Feb. 25, 2000 [3 pgs.].
Deposition of Andrew D. Swart, Sep. 5, 2008, in Civil Action No. 2:07cv589 (WDK-FBS) (E.D. Va.), Exhibit 216, email from "Andrew" sent Nov. 30, 1999 [7 pgs.].
Deposition of Andrew D. Swart, Sep. 5, 2008, in Civil Action No. 2:07cv589 (WDK-FBS) (E.D. Va.), Exhibit 219, email from "Andrew" sent Sep. 24, 1996 [3 pgs.].
Deposition of Andrew D. Swart, Sep. 5, 2008, in Civil Action No. 2:07cv589 (WDK-FBS) (E.D. Va.), Exhibit 220, document titled "Statement of Opposition, European Patent No. 1 143 337 B", Apr. 23, 2004 [41 pgs.].
Deposition of Andrew D. Swart, Aug. 21, 2008, in Civil Action No. 2:07cv589 (WDK-FBS) (E.D. Va.), Exhibit 154, email [4 pgs.].
Deposition of Andrew D. Swart, Aug. 21, 2008, in Civil Action No. 2:07cv589 (WDK-FBS) (E.D. Va.), Exhibit 155, document titled "WebRepeater™ Functional Requirements," Dave Farber, Sandpiper Software Consulting, LLC, Jun. 18, 1996. [20 pgs.].
Deposition of Andrew D. Swart, Aug. 21, 2008, in Civil Action No. 2:07cv589 (WDK-FBS) (E.D. Va.), Exhibit 156 doc. titled "Project Status Meeting Reports," Aug. 4, 1997 [3 pgs.].
Deposition of Andrew D. Swart, Aug. 21, 2008, in Civil Action No. 2:07cv589 (WDK-FBS) (E.D. Va.), Exhibit 157, parts of U.S. Appl. No. 09/021,506 from PTO [68 pgs.].
Deposition of Andrew D. Swart, Aug. 21, 2008, in Civil Action No. 2:07cv589 (WDK-FBS) (E.D. Va.), Exhibit 158, documents from PTO file for U.S. Appl. No. 09/612,598 [59 pgs.].
Deposition of Andrew D. Swart, Aug. 21, 2008, in Civil Action No. 2:07cv589 (WDK-FBS) (E.D. Va.), Exhibit 159, email from Dave Farber sent Mar. 14, 1997 [12 pgs.].
Deposition of Andrew D. Swart, Aug. 21, 2008, in Civil Action No. 2:07cv589 (WDK-FBS) (E.D. Va.), Exhibit 160, email from "Andrew" sent Jan. 15, 1997 [3 pgs.].
Deposition of Andrew D. Swart, Aug. 21, 2008, in Civil Action No. 2:07cv589 (WDK-FBS) (E.D. Va.), Exhibit 161, email from "Will", sent Oct. 17, 1997 [24 pgs.].
Deposition of Andrew D. Swart, Aug. 21, 2008, in Civil Action No. 2:07cv589 (WDK-FBS) (E.D. Va.), Exhibit 162, email from Rick Greer sent Jan. 20, 1999 [7 pgs.].
Deposition of Andrew D. Swart, Aug. 21, 2008, in Civil Action No. 2:07cv589 (WDK-FBS) (E.D. Va.), Exhibit 163, email from "Andrew" sent Jul. 22, 1996 [2 pgs.].
Deposition of Andrew D. Swart, Aug. 21, 2008, in Civil Action No. 2:07cv589 (WDK-FBS) (E.D. Va.), Exhibit 164, European Patent No. 1 143 337 (WO 99/40514) [64 pgs.].
Deposition of Andrew D. Swart, Aug. 21, 2008, in Civil Action No. 2:07cv589 (WDK-FBS) (E.D. Va.), Exhibit 165, European Patent Specification No. 1 143 337 [31 pgs.].
Deposition of Andrew D. Swart, Aug. 21, 2008, in Civil Action No. 2:07cv589 (WDK-FBS) (E.D. Va.), Exhibit 166, email from Will Crowder sent Aug. 24, 1997 [1 pg.].
Deposition of Andrew D. Swart, Aug. 21, 2008, in Civil Action No. 2:07cv589 (WDK-FBS) (E.D. Va.), Exhibit 167, email from Chris Newton sent Oct. 26, 2000 [7 pgs.].
Deposition of Andrew D. Swart, Aug. 21, 2008, in Civil Action No. 2:07cv589 (WDK-FBS) (E.D. Va.), Exhibit 168, document titled "Sandpiper Raises $6.6 Million to Boost Content Distribution for Web Publishers," May 19, 1998 [2 pgs.].
Deposition of Andrew D. Swart, Aug. 21, 2008, in Civil Action No. 2:07cv589 (WDK-FBS) (E.D. Va.), Exhibit 169 document titled "Sandpiper Launches Footprint Distribution Service to Improve Web Site Performance; Cost-Effective Service Manages Content Delivery for Web Publishers," Sep. 28, 1998 [3 pgs.].
Deposition of Andrew D. Swart, Aug. 21, 2008, in Civil Action No. 2:07cv589 (WDK-FBS) (E.D. Va.), Exhibit 170 document titled "Sandpiper Completes New Executive Management Team; Sandpiper Poised for Growth with Strong Executive Team," Sep. 28, 1998 [2 pgs.].
Deposition of Andrew D. Swart, Aug. 21, 2008, in Civil Action No. 2:07cv589 (WDK-FBS) (E.D. Va.), Exhibit 171 document titled "Sandpiper Addresses Web Content Management Problems at Herring on Hollywood;—New Technology Company Offers Solutions to Entertainment Industry's Internet Woes," Sep. 28, 19.
Deposition of David A. Farber, Sep. 9, 2008, in Civil Action No. 2:07cv589 (WDK-FBS) (E.D. Va.), Depo. Exhibit 10, email from David A. Farber, Jan. 11, 1999 [4 pgs.].
Deposition of David A. Farber, Sep. 9, 2008, in Civil Action No. 2:07cv589 (WDK-FBS) (E.D. Va.), Depo. Exhibit 11, U.S. Pat. No. 6,185,598 [23 pgs.].
Deposition of David A. Farber, Sep. 9, 2008, in Civil Action No. 2:07cv589 (WDK-FBS) (E.D. Va.), Depo. Exhibit 12, email from David A. Farber, Jan. 18, 1999.
Deposition of David A. Farber, Sep. 9, 2008, in Civil Action No. 2:07cv589 (WDK-FBS) (E.D. Va.), Depo. Exhibit 13, email from Will Crowder, Feb. 17, 1999.
Deposition of David A. Farber, Sep. 9, 2008, in Civil Action No. 2:07cv589 (WDK-FBS) (E.D. Va.), Depo. Exhibit 155 document titled "WebRepeater™ Functional Requirements," Dave Farber, Sandpiper Software Consulting, LLC, Jun. 18, 1996.
Deposition of David A. Farber, Sep. 9, 2008, in Civil Action No. 2:07cv589 (WDK-FBS (E.D. Va.), Depo. Exhibit 16 email from Will Crowder, May 6, 1999.
Deposition of David A. Farber, Sep. 9, 2008, in Civil Action No. 2:07cv589 (WDK-FBS) (E.D. Va.), Depo. Exhibit 166, email from Will Crowder, Aug. 24, 1997.
Deposition of David A. Farber, Sep. 9, 2008, in Civil Action No. 2:07cv589 (WDK-FBS) (E.D. Va.), Depo. Exhibit 19, email from David A. Farber, May 12, 1999.
Deposition of David A. Farber, Sep. 9, 2008, in Civil Action No. 2:07cv589 (WDK-FBS) (E.D. Va.), Depo. Exhibit 2, email from Dave Farber dated Oct. 15, 1997 [2 pgs.].
Deposition of David A. Farber, Sep. 9, 2008, in Civil Action No. 2:07cv589 (WDK-FBS) (E.D. Va.), Depo. Exhibit 22, document titled "Patent Claim: Resource Request Redirector," Dave Farber, Sandpiper Software Consulting, LLC, Draft 3, May 24, 1996.
Deposition of David A. Farber, Sep. 9, 2008, in Civil Action No. 2:07cv589 (WDK-FBS) (E.D. Va.), Depo. Exhibit 226, email from Peggy Balesteri, Aug. 7, 2008.
Deposition of David A. Farber, Sep. 9, 2008, in Civil Action No. 2:07cv589 (WDK-FBS) (E.D. Va.), Depo. Exhibit 227, email from Dave Farber, May 29, 1996.
Deposition of David A. Farber, Sep. 9, 2008, in Civil Action No. 2:07cv589 (WDK-FBS) (E.D. Va.), Depo. Exhibit 228, email from "Dave" dated Jul. 12, 1996.
Deposition of David A. Farber, Sep. 9, 2008, in Civil Action No. 2:07cv589 (WDK-FBS) (E.D. Va.), Depo. Exhibit 229, email from "Andrew" dated Jul. 22, 1996.
Deposition of David A. Farber, Sep. 9, 2008, in Civil Action No. 2:07cv589 (WDK-FBS) (E.D. Va.), Depo. Exhibit 230, email from "Dave" dated Jul. 10, 1996.
Deposition of David A. Farber, Sep. 9, 2008, in Civil Action No. 2:07cv589 (WDK-FBS) (E.D. Va.), Depo. Exhibit 231, document titled "Patent Claim: Network Reflector/Repeater," Dave Farber, Sandpiper Software Consulting, LLC, Draft 5, Jul. 2, 1996.

(56) References Cited

OTHER PUBLICATIONS

Deposition of David A. Farber, Sep. 9, 2008, in Civil Action No. 2:07cv589 (WDK-FBS) (E.D. Va.), Depo. Exhibit 232, document titled "WebRepeater Features Comparison", Sandpiper Software Consulting, Sep. 17, 1996.

Deposition of David A. Farber, Sep. 9, 2008, in Civil Action No. 2:07cv589 (WDK-FBS) (E.D. Va.), Depo. Exhibit 233, email from "Hussain" sent Sep. 19, 1998.

Deposition of David A. Farber, Sep. 9, 2008, in Civil Action No. 2:07cv589 (WDK-FBS) (E.D. Va.), Depo. Exhibit 234, email from "Scott" sent May 30, 1998.

Deposition of David A. Farber, Sep. 9, 2008, in Civil Action No. 2:07cv589 (WDK-FBS) (E.D. Va.), Depo. Exhibit 235, email from "Andrew" sent Feb. 12, 1999.

Deposition of David A. Farber, Sep. 9, 2008, in Civil Action No. 2:07cv589 (WDK-FBS) (E.D. Va.), Depo. Exhibit 236, email from David A. Farber sent Apr. 19, 1999.

Deposition of David A. Farber, Sep. 9, 2008, in Civil Action No. 2:07cv589 (WDK-FBS) (E.D. Va.), Depo. Exhibit 237, email from David A. Farber sent May 12, 1999.

Deposition of David A. Farber, Sep. 9, 2008, in Civil Action No. 2:07cv589 (WDK-FBS) (E.D. Va.), Depo. Exhibit 238, email from David A. Farber sent May 6, 1999 [1 pg.].

Deposition of David A. Farber, Sep. 9, 2008, in Civil Action No. 2:07cv589 (WDK-FBS) (E.D. Va.), Depo. Exhibit 239, document titled "Footprint DNS Server Mini-Specification," Will Crowder, Apr. 23, 1999.

Deposition of David A. Farber, Sep. 9, 2008, in Civil Action No. 2:07cv589 (WDK-FBS) (E.D. Va.), Depo. Exhibit 240, email from "David" sent Jun. 4, 1999.

Deposition of David A. Farber, Sep. 9, 2008, in Civil Action No. 2:07cv589 (WDK-FBS) (E.D. Va.), Depo. Exhibit 241, email from David A. Farber sent Dec. 6, 1999.

Deposition of David A. Farber, Sep. 9, 2008, in Civil Action No. 2:07cv589 (WDK-FBS) (E.D. Va.), Depo. Exhibit 242, email from Chris Newton, sent Oct. 26, 2000.

Deposition of David A. Farber, Sep. 9, 2008, in Civil Action No. 2:07cv589 (WDK-FBS) (E.D. Va.), Depo. Exhibit 243, email from "Andrew" sent Jul. 24, 2000.

Deposition of David A. Farber, Sep. 9, 2008, in Civil Action No. 2:07cv589 (WDK-FBS) (E.D. Va.), Depo. Exhibit 244, email from Andrew Swart sent Nov. 12, 1999.

Deposition of David A. Farber, Sep. 9, 2008, in Civil Action No. 2:07cv589 (WDK-FBS) (E.D. Va.), Depo. Exhibit 245, email from Andrew Swart sent Aug. 23, 2002.

Deposition of David A. Farber, Sep. 9, 2008, in Civil Action No. 2:07cv589 (WDK-FBS) (E.D. Va.), Depo. Exhibit 246, email from "Jim" sent Dec. 16, 1999.

Deposition of David A. Farber, Sep. 9, 2008, in Civil Action No. 2:07cv589 (WDK-FBS) (E.D. Va.), Depo. Exhibit 247, email from "Jim" sent Nov. 17, 1999.

Deposition of David A. Farber, Sep. 9, 2008, in Civil Action No. 2:07cv589 (WDK-FBS) (E.D. Va.), Depo. Exhibit 248, email from "Jim" sent Nov. 17, 1999.

Deposition of David A. Farber, Sep. 9, 2008, in Civil Action No. 2:07cv589 (WDK-FBS) (E.D. Va.), Depo. Exhibit 249, email from Will Crowder sent Dec. 21, 1998.

Deposition of David A. Farber, Sep. 9, 2008, in Civil Action No. 2:07cv589 (WDK-FBS) (E.D. Va.), Depo. Exhibit 250, email from Chris Newton sent Feb. 15, 2000.

Deposition of David A. Farber, Sep. 9, 2008, in Civil Action No. 2:07cv589 (WDK-FBS) (E.D. Va.), Depo. Exhibit 5, U.S. Pat. No. 6,654,807 [28 pgs.].

Deposition of David A. Farber, Sep. 9, 2008, in Civil Action No. 2:07cv589 (WDK-FBS) (E.D. Va.), Depo. Exhibit 6, U.S. Pat. No. 7,054,935 [14 pgs.].

Deposition of David A. Farber, Sep. 9, 2008, in Civil Action No. 2:07cv589 (WDK-FBS) (E.D. Va.), Depo. Exhibit 7, email from David A. Farber, Dec. 21, 1998 [2 pgs.].

Deposition of David A. Farber, Sep. 9, 2008, in Civil Action No. 2:07cv589 (WDK-FBS) (E.D. Va.), Depo. Exhibit 8, email from David A. Farber, Jan. 11, 1999 [1 pg.].

Deposition of David A. Farber, Sep. 9, 2008, in Civil Action No. 2:07cv589 (WDK-FBS) (E.D. Va.), Depo. Exhibit 9, email from Jim Baiter, Apr. 19, 1999 [4 pgs.].

Deposition of James A. Balter in Civil Action No. 2:07cv589 (WDK-FBS) (E.D. Va.), Aug. 8, 2008, Deposition Exhibit 1, Subpoena in Civil Case [10 pgs.].

Deposition of James A. Balter in Civil Action No. 2:07cv589 (WDK-FBS) (E.D. Va.), Aug. 8, 2008, Deposition Exhibit 2, email from Dave Farber dated Oct. 15, 1997 [2 pgs.].

Deposition of James A. Balter, Civil Action No. 2:07cv589 (WDK-FBS) (E.D. Va.), Aug. 8, 2008, Depo. Exhibit 10, email from David A. Farber dated Jan. 11, 1999 [4 pgs.].

Deposition of James A. Balter, Civil Action No. 2:07cv589 (WDK-FBS) (E.D. Va.), Aug. 8, 2008, Depo. Exhibit 11, U.S. Pat. No. 6,185,598 [23 pgs.].

Deposition of James A. Balter, Civil Action No. 2:07cv589 (WDK-FBS) (E.D. Va.), Aug. 8, 2008, Depo. Exhibit 12, email from David A. Farber dated Jan. 18, 1999 [ 4 pgs.].

Deposition of James A. Balter, Civil Action No. 2:07cv589 (WDK-FBS) (E.D. Va.), Aug. 8, 2008, Depo. Exhibit 13, email from Will Crowder dated Feb. 17, 1999 [9 pgs.].

Deposition of James A. Balter, Civil Action No. 2:07cv589 (WDK-FBS) (E.D. Va.), Aug. 8, 2008, Depo. Exhibit 14, email from Jim Balter dated Sep. 8, 2000 [3 pgs].

Deposition of James A. Balter, Civil Action No. 2:07cv589 (WDK-FBS) (E.D. Va.), Aug. 8, 2008, Depo. Exhibit 15, email from Will Crowder dated May 12, 1999 [2 pgs.].

Deposition of James A. Balter, Civil Action No. 2:07cv589 (WDK-FBS) (E.D. Va.), Aug. 8, 2008, Depo. Exhibit 16, email from Will Crowder dated May 6, 1999 [2 pgs.].

Deposition of James A. Balter, Civil Action No. 2:07cv589 (WDK-FBS) (E.D. Va.), Aug. 8, 2008, Depo. Exhibit 17, email from Will Crowder dated Apr. 22, 1999 [9 pgs.].

Deposition of James A. Balter, Civil Action No. 2:07cv589 (WDK-FBS) (E.D. Va.), Aug. 8, 2008, Depo. Exhibit 18, email from Jim Balter dated Apr. 22, 1999 [1 pg.].

Deposition of James A. Balter, Civil Action No. 2:07cv589 (WDK-FBS) (E.D. Va.), Aug. 8, 2008, Depo. Exhibit 19, email from David A. Farber dated May 12, 1999 [1 pg.].

Deposition of James A. Balter, Civil Action No. 2:07cv589 (WDK-FBS) (E.D. Va.), Aug. 8, 2008, Depo. Exhibit 20, email from lf-tech@sandpiper.com dated Nov. 25, 1997 [3 pgs.].

Deposition of James A. Balter, Civil Action No. 2:07cv589 (WDK-FBS) (E.D. Va.), Aug. 8, 2008, Depo. Exhibit 21, document titled "Patent Claim: HTTP Redirector" Draft 2, May 20, 1996, Dave Farber, Sandpiper Software Consulting, LLC [11 pgs.].

Deposition of James A. Balter, Civil Action No. 2:07cv589 (WDK-FBS) (E.D. Va.), Aug. 8, 2008, Depo. Exhibit 22, document titled "Patent Claim: Resource Request Redirector," Dave Farber, Sandpiper Software Consulting, LLC, Draft 3, May 24, 1996 [17 pgs.].

Deposition of James A. Balter, Civil Action No. 2:07cv589 (WDK-FBS) (E.D. Va.), Aug. 8, 2008, Depo. Exhibit 23, document titled "Patent Claim: Network Reflector/Repeater," Dave Farber, Sandpiper Software Consulting, LLC, Draft 5, Jul. 2, 1996 [21 pgs.].

Deposition of James A. Balter, Civil Action No. 2:07cv589 (WDK-FBS) (E.D. Va.), Aug. 8, 2008, Depo. Exhibit 24, document titled "Software Design Specification: Advanced Rewrite Tool," J. Balter, Dec. 3, 1999, Sandpiper Networks, Inc.

Deposition of James A. Balter, Civil Action No. 2:07cv589 (WDK-FBS) (E.D. Va.), Aug. 8, 2008, Depo. Exhibit 3, email from Andrew Swart dated Apr. 1, 1998 [1 pg.].

Deposition of James A. Balter, Civil Action No. 2:07cv589 (WDK-FBS) (E.D. Va.), Aug. 8, 2008, Depo. Exhibit 4, email from Rick [Richard] Greer dated Dec. 14, 1998 [6 pgs].

Deposition of James A. Balter, Civil Action No. 2:07cv589 (WDK-FBS) (E.D. Va.), Aug. 8, 2008, Depo. Exhibit 5, U.S. Patent No. 6,654,807 [28 pgs.].

Deposition of James A. Balter, Civil Action No. 2:07cv589 (WDK-FBS) (E.D. Va.), Aug. 8, 2008, Depo. Exhibit 6, U.S. Patent No. 7,054,935 [24 pgs.].

(56) References Cited

OTHER PUBLICATIONS

Deposition of James A. Balter, Civil Action No. 2:07cv589 (WDK-FBS) (E.D. Va.), Aug. 8, 2008, Depo. Exhibit 7, email from David A. Farber dated Dec. 21, 1998 [2 pg.].
Deposition of James A. Balter, Civil Action No. 2:07cv589 (WDK-FBS) (E.D. Va.), Aug. 8, 2008, Depo. Exhibit 8, email from David A. Farber dated Jan. 11, 1999 [1 pg.].
Deposition of James A. Balter, Civil Action No. 2:07cv589 (WDK-FBS) (E.D. Va.), Aug. 8, 2008, Depo. Exhibit 9, email from Jim [James] Balter dated Apr. 19, 1999 [4 pgs.].
Deposition of Richard E. Greer, Sep. 3, 2008, in Civil Action No. 2:07cv589 (WDK-FBS) (E.D. Va.), Depo. Exhibit 11, U.S. Pat. No. 6,185,598 [23 pgs.].
Deposition of Richard E. Greer, Sep. 3, 2008, in Civil Action No. 2:07cv589 (WDK-FBS) (E.D. Va.), Depo. Exhibit 12, email from David A. Farber sent Jan. 18, 1999 [4 pgs.].
Deposition of Richard E. Greer, Sep. 3, 2008, in Civil Action No. 2:07cv589 (WDK-FBS) (E.D. Va.), Depo. Exhibit 195, document titled "Web Repeater" (Interactive Systems Corporation), Sandpiper Software, Nov. 23, 1996, [80 pgs].
Deposition of Richard E. Greer, Sep. 3, 2008, in Civil Action No. 2:07cv589 (WDK-FBS) (E.D. Va.), Depo. Exhibit 196, Subpoena in Civil Case 2:07cv589 RGD/FBS (E.D. Va.), Jun. 19, 2008 [10 pgs.].
Deposition of Richard E. Greer, Sep. 3, 2008, in Civil Action No. 2:07cv589 (WDK-FBS) (E.D. Va.), Depo. Exhibit 197, email from Rick Greer sent Feb. 18, 1999 [3 pgs.].
Deposition of Richard E. Greer, Sep. 3, 2008, in Civil Action No. 2:07cv589 (WDK-FBS) (E.D. Va.), Depo. Exhibit 198, email from Rick Greer sent Jan. 20, 1999 [7 pgs.].
Deposition of Richard E. Greer, Sep. 3, 2008, in Civil Action No. 2:07cv589 (WDK-FBS) (E.D. Va.), Depo. Exhibit 199, email from Rick@sandpiper.com sent Oct. 9, 1998.
Deposition of Richard E. Greer, Sep. 3, 2008, in Civil Action No. 2:07cv589 (WDK-FBS) (E.D. Va.), Depo. Exhibit 200 email from Rick@sandpiper.com sent Oct. 2, 1998 [2 pgs.].
Deposition of Richard E. Greer, Sep. 3, 2008, in Civil Action No. 2:07cv589 (WDK-FBS) (E.D. Va.), Depo. Exhibit 201, email from Will Crowder sent Dec. 21, 1998 [2 pgs.].
Deposition of Richard E. Greer, Sep. 3, 2008, in Civil Action No. 2:07cv589 (WDK-FBS) (E.D. Va.), Depo. Exhibit 202, email from rick@digisle.com sent Nov. 20, 2000 [2 pgs.].
Deposition of Richard E. Greer, Sep. 3, 2008, in Civil Action No. 2:07cv589 (WDK-FBS) (E.D. Va.), Depo. Exhibit 203, mail from David A. Farber sent Nov. 3, 1999 [1 pg.].
Deposition of Richard E. Greer, Sep. 3, 2008, in Civil Action No. 2:07cv589 (WDK-FBS) (E.D. Va.), Depo. Exhibit 4, email from Rick Greer sent Dec. 14, 1998 [6 pgs.].
Deposition of Richard E. Greer, Sep. 3, 2008, in Civil Action No. 2:07cv589 (WDK-FBS) (E.D. Va.), Depo. Exhibit 5, U.S. Pat. No. 6,654,807 [28 pgs.].
Deposition of Richard E. Greer, Sep. 3, 2008, in Civil Action No. 2:07cv589 (WDK-FBS) (E.D. Va.), Depo. Exhibit 6, U.S. Pat. No. 7,054,935 [24 pgs.].
Deposition of Richard E. Greer, Sep. 3, 2008, in Civil Action No. 2:07cv589 (WDK-FBS) (E.D. Va.), Depo. Exhibit 7, email from David A. Farber sent Dec. 21, 1998 [2 pgs.].
Deposition of Richard E. Greer, Sep. 3, 2008, in Civil Action No. 2:07cv589 (WDK-FBS) (E.D. Va.), Depo. Exhibit 8, email from David A. Farber sent Jan. 11, 1999 [4 pgs.].
Deposition Transcript of Andrew D. Swart, Aug. 21, 2008, in Civil Action No. 2:07cv589 (WDK-FBS) (E.D. Va.) [redacted, 98 pgs.].
Deposition Transcript of Andrew D. Swart, Sep. 5, 2008, in Civil Action No. 2:07cv589 (WDK-FBS) (E.D. Va.) [redacted, 78 pgs.].
Deposition transcript of David A. Farber, Sep. 9, 2008, in Civil Action No. 2:07cv589 (WDK-FBS) (E.D. Va.) [87 pgs.].
Deposition Transcript of James A. Balter, Aug. 8, 2008, in Civil Action No. 2:07cv589 (WDK-FBS) (E.D. Va.) [69 pgs.].
Deposition transcript of Richard E. Greer, Sep. 3, 2008, in Civil Action No. 2:07cv589 (WDK-FBS) (E.D. Va.) [79 pgs.].
Exhibit A to Reply and Supplemental Report of Dr. Kevin C. Almeroth to the Answering Report of Scott Bradner, in Civil Action No. 2:07cv589 (RGD-FBS) (E.D. Va.) Sep. 5, 2008 [14 pgs.].
Exhibit B to Reply and Supplemental Report of Dr. Kevin C. Almeroth to the Answering Report of Scott Bradner, in Civil Action No. 2:07cv589 (RGD-FBS) (E.D. Va.) Sep. 5, 2008 [12 pgs.].
Exhibit C to Reply and Supplemental Report of Dr. Kevin C. Almeroth to the Answering Report of Scott Bradner, in Civil Action No. 2:07cv589 (RGD-FBS) (E.D. Va.) Sep. 5, 2008 [12 pgs.].
Exhibit D to Reply and Supplemental Report of Dr. Kevin C. Almeroth to the Answering Report of Scott Bradner, in Civil Action No. 2:07cv589 (RGD-FBS) (E.D. Va.) Sep. 5, 2008 [13 pgs.].
Joint Statement Regarding Claim Construction with Exhibit "The '807 and '935 Footprint Patents," in Civil Action No. 2:07cv589 (RGD-FBS) (E.D. Va.), filed Jul. 9, 2008 [27 pgs.].
Jury Verdict Form in Civil Action No. 2:07cv589 (MSD-FBS), Jan. 23, 2009 [3 pgs.].
Level 3 Markman Presentation Powerpoint, in Civil Action No. 2:07cv589, Jul. 9, 2008 [16 pgs.].
Level 3's Motion for Judgment as a Matter of Law or, in the Alternative, for a New Trial Pursuant to Rules 50(B) and 59(A), in Civil File No. 2:07CV589 (E.D. Va.), Feb. 9, 2009 [3 pgs.].
Level 3's Reply in Further Support of Its Motion for Judgment as a Matter of Law or, in the Alternative, for a New Trial Pursuant to Rules 50(B) and 59(A), Mar. 12, 2009, in Civil Action No. 2:07cv589 (MSD-FBS) (E.D. Va.) [22 pgs.].
Limelight Claim Construction Hearing Presentation, in Civil Action No. 2:07cv589, Jul. 14, 2008 [123 pgs.].
Limelight's Opposition to Level 3's Motion for Judgment as a Matter of Law or, in the Alternative, for a New Trial Pursuant to Rules 50(B) and 59(A), Mar. 2, 2009, in Civil Action No. 2:07cv589 (MSD-FBS) (E.D. Va.) [31 pgs.].
Memorandum of Law in Support of Level 3's Proposed Claim Constructions in Case No. 2:07cv589 RDG FBS, (E.D. Va.) Jun. 14, 2008 [32 pgs. + exhibits].
Reply and Supplemental Report of Dr. Kevin C. Almeroth to the Answering Report of Scott Bradner, in Civil Action No. 2:07cv589 (RGD-FBS) (E.D. Va.) Sep. 5, 2008 [62 pgs.].
Second Supplemental Expert Report of Dr. Kevin C. Almeroth Civil Action No. 2:07cv589 (RGD-FBS) (E.D. Va.) Dec. 24, 2008 [9 pgs.].
Supplemental Answering Report of Scott Bradner Pursuant to Fed. R. Civ. 26(a)(2)(B) Concerning the Validity of U.S. Patent No. 6,654,807 Civil Action No. 2:07CV589 (RGD-FBS) (E.D. Va.) Dec. 10, 2008 [28 pgs.].
Transcript of Proceedings for Jury Trial, Norfolk, VA, Jan. 7 to 23, 2009, in Civil Action No. 2:07cv589 (E.D. Va.) [1052 pgs.].
Transcript of Proceedings for Markman Follow-up Hearing, Norfolk, VA, Oct. 23, 2008, in Civil Action No. 2:07cv589 (E.D. Va.) [58 pgs.].
Transcript of Proceedings for Markman Hearing, Norfolk, VA, Jul. 14, 2008, in Civil Action No. 2:07cv589 (E.D. Va.) [69 pgs.].
U.S.P.T.O. Non-Final Office Action in U.S. Appl. No. 11/980,689, May 20, 2009.
U.S.P.T.O. Office Action in U.S. Appl. No. 11/980,684, May 19, 2009.
"Cisco DistributedDirector," Cisco Systems, Inc., White Paper, cited in Expert Report of Kevin Almeroth with date of 1996 (month unknown). [9 pages].
Almeroth, K., et al. "Scalable Delivery of Web Pages Using Cyclic Best-Effort (UDP) Multicast", IEEE INFOCOM, San Francisco, California, USA, Jun. 1998.
Almeroth, K., Exhibit A to Expert Report of Dr. Kevin C. Almeroth filed in Civil Action No. 2:07cv589 (RGD-FBS), U.S. Dist. Ct. E.D. Va., dated Jul. 25, 2008, [31 pages].
Almeroth, K., Exhibit B to Expert Report of Dr. Kevin C. Almeroth filed in Civil Action No. 2:07cv589 (RGD-FBS), U.S. Dist. Ct. E.D. Va., dated Jul. 25, 2008 [131 pages].
Almeroth, K., Exhibit C to Expert Report of Dr. Kevin C. Almeroth filed in Civil Action No. 2:07cv589 (RGD-FBS), U.S. Dist. Ct. E.D. Va., dated Jul. 25, 2008 [157 pages].
Almeroth, K., Exhibit D to Expert Report of Dr. Kevin C. Almeroth filed in Civil Action No. 2:07cv589 (RGD-FBS), U.S. Dist. Ct. E.D. Va., dated Jul. 25, 2008 [128 pages].

(56) References Cited

OTHER PUBLICATIONS

Almeroth, K., Exhibit E Expert Report of Dr. Kevin C. Almeroth filed in Civil Action No. 2:07cv589 (RGD-FBS), U.S. Dist. Ct. E.D. Va., dated Jul. 25, 2008 [286 pages].
Almeroth, K., Exhibit F to Expert Report of Dr. Kevin C. Almeroth filed in Civil Action No. 2:07cv589 (RGD-FBS), U.S. Dist. Ct. E.D. Va., dated Jul. 25, 2008 [221 pages].
Almeroth, K., Exhibit G to Expert Report of Dr. Kevin C. Almeroth filed in Civil Action No. 2:07cv589 (RGD-FBS), U.S. Dist. Ct. E.D. Va., dated Jul. 25, 2008 [369 pages].
Almeroth, K., Exhibit H to Expert Report of Dr. Kevin C. Almeroth filed in Civil Action No. 2:07cv589 (RGD-FBS), U.S. Dist. Ct. E.D. Va., dated Jul. 25, 2008 [59 pages].
Almeroth, K., Exhibit I to Expert Report of Dr. Kevin C. Almeroth filed in Civil Action No. 2:07cv589 (RGD-FBS), U.S. Dist. Ct. E.D. Va., dated Jul. 25, 2008 [95 pages].
Almeroth, K., Exhibit J to Expert Report of Dr. Kevin C. Almeroth filed in Civil Action No. 2:07cv589 (RGD-FBS), U.S. Dist. Ct. E.D. Va., dated Jul. 25, 2008, [105 pages].
Almeroth, K., Exhibit K-1 to Expert Report of Dr. Kevin C. Almeroth filed in Civil Action No. 2:07cv589 (RGD-FBS), U.S. Dist. Ct. E.D. Va., dated Jul. 25, 2008, [152 pages].
Almeroth, K., Exhibit K-2 to Expert Report of Dr. Kevin C. Almeroth filed in Civil Action No. 2:07cv589 (RGD-FBS), U.S. Dist. Ct. E.D. Va., dated Jul. 25, 2008 [25 pages].
Almeroth, K., Expert Report of Dr. Kevin C. Almeroth filed in Civil Action No. 2:07cv589 (RGD-FBS), U.S. Dist. Ct. E.D. Va., dated Jul. 25, 2008, [64 pages and Exhibits A-J, K1, K2].
Baentsch, M., et al., "Introducing Application-Level Replication and Naming into Today's Web," Computer Networks and ISDN Systems, vol. 28, No. 7-11, pp. 921-930, May 1996.
Berners-Lee, T. & Connolly, D., "Hypertext Markup Language—2.0," Internet Engineering Task Force (IETF) Request for Comments (RFC) 1866, Nov. 1995.
Berners-Lee, T., et al., "Hypertext Transfer Protocol—HTTP/1.0," Internet Engineering Task Force (IETF) Internet Draft, draft-ietf-http-v10-spec-00.ps, Mar. 1995.
Berners-Lee, T., et al., "Hypertext Transfer Protocol—HTTP/1.0," Internet Engineering Task Force (IETF) Request for Comments (RFC) 1945, May 1996.
Berners-Lee, T.. "Resource Identifiers in WWW: A Unifying Syntax for the Expression of Names and Addresses of Objects on the Network as used in the World-Wide Web," Internet Engineering Task Force (IETF) Request for Comments (RFC) 1630, Jun. 1994.
Bestavros, A. Demand-based document dissemination to reduce traffic and balance load in distributed information systems. In Proc. IEEE Symp. on Parallel and Distributed Processing, San Antonio, TX, Oct. 1995.
Callon, R., "Use of OSI IS-IS for Routing in TCP/IP and Dual Environments," Internet Engineering Task Force (IETF) Request for Comments (RFC) 1195, Dec. 1990.
Chandra, R. et al., "BGP Communities Attribute," Internet Engineering Task Force (IETF) Request for Comments (RFC) 1997, Aug. 1996.
Chen, E., et al., "An Application of the BGP Community Attribute in Multi-home Routing," Internet Engineering Task Force (IETF) Request for Comments (RFC) 1998, Aug. 1996.
Claims of European Patent No. 1 143 337 B allowed/maintained in oral proceedings, Apr. 24, 2008 [7 pages].
Colajanni, M., et al., "Scheduling Algorithms for Distributed Web Servers," International Conf. on Distributed Computing Systems (ICDCS), Baltimore, Maryland, USA, May 1997.
Communication from European Patent Office dated Feb. 8, 2007 regarding opposition to European Patent No. 1 143 337 B [11 pages].
Communication from European Patent Office dated May 30, 2008 in patent application EP 99906680 (12 pages).
Eriksson, H., "MBONE: The Multicast Backbone," Communications of the ACM, vol. 37, No. 8, p. 54-60, Aug. 1994.

Fielding, R., et al., "Hypertext Transfer Protocol—HTTP/1.1," Internet Engineering Task Force (IETF) Internet Draft, draft-ietf-http-v11-spec-00.txt, Nov. 1995.
Fielding, R., et al., "Hypertext Transfer Protocol—HTTP/1.1," Internet Engineering Task Force(IETF) Request for Comments (RFC) 2068, Jan. 1997.
Malkin, G., "RIP Version 2 Carrying Additional Information," Internet Engineering Task Force (IETF) Request for Comments (RFC) 1388, Jan. 1993.
Moy, J., "OSPF Version 2," Internet Engineering Task Force (IETF) Request for Comments (RFC) 1583, Mar. 1994.
Notice of Opposition to a European Patent filed against European Patent No. 1 143 337 B, by Akamai Technologies, Inc., Apr. 23, 2004 [5 pages].
Owner's Response of Apr. 10, 2007 to summons to attend oral proceedings dated Feb. 8, 2007 in Opposition Procedure of European Patent No. 1 143 337 B, including auxiliary requests 1 and 2 and attachment discussing claim features [26 pages].
Owner's Response of Mar. 20, 2008 to summons to attend oral proceedings dated Jan. 24, 2008 in Opposition Procedure of European Patent No. 1 143 337 B, including auxiliary requests 3 to 7 [21 pages].
Parris C., et al, "A Dynamic Connection Management Scheme for Guaranteed Performance Services in Packet-Switching Integrated Services Networks," UC Berkeley Computer Science Division Tech. Report TR-93-005, 1993.
Parris C., et al, "The Dynamic Management of Guaranteed Performance Connections in Packet Switched Integrated Service Networks," UC Berkeley Computer Science Division and International Computer Science Institute Tech. Report CSD-94-859, 1994.
Partridge, C., et al., "Host Anycasting Service," Internet Engineering Task Force (IETF) Request for Comments (RFC) 1546, Nov. 1993.
Povey, D. et al., "A distributed internet cache," in Proc. of the 20th Australasian Computer Science Conf., Feb. 1997.
Rekhter Y., et al., "A Border Gateway Protocol 4 (BGP-4)," Internet Engineering Task Force (IETF) Request for Comments (RFC) 1771, Mar. 1995.
Rekhter Y., et al., "Application of the Border Gateway Protocol in the Internet," Internet Engineering Task Force (IETF) Request for Comments (RFC) 1772, Mar. 1995.
Reply of Dec. 21, 2004 of the Patent Proprietor to the Notice of Opposition of European Patent No. 1 143 337 B, Responsive to the Notice of Opposition of Akamai Technologies, Inc. dated Apr. 23, 2004 [11 pages].
Statement of Opposition to European Patent No. 1 143 337 B, filed by Akamai Technologies, Inc. Apr. 23, 2004 [43 pages].
Topolcic, C., "Experimental Internet Stream Protocol, Version 2 (ST-II)," Internet Engineering Task Force (IETF) Request for Comments (RFC) 1190, Oct. 1990.
Touch, J. et al., "The X-Bone,". Third Global Internet Mini-Conference at Globecom '98. Sydney, Australia, Nov. 1998, pp. 59-68 (pp. 44-52 of the mini-conference).
Traina, P., "BGP-4 Protocol Analysis," Internet Engineering Task Force (IETF) Request for Comments (RFC) 1774, Mar. 1995.
Traina, P., "Experience with the BGP-4 protocol," Internet Engineering Task Force (IETF) Request for Comments (RFC) 1773, Mar. 1995.
Wessels, D. et al., RFC 2187, "Application of Internet Cache Protocol (ICP), Version 2", Sep. 1997, Memo; Internet RFC/STD/FYI/BCP Archives; Network Working Group.
Written Submissions in Opposition to European Patent No. 1 143 337 B, by Akamai Technologies, Inc., Apr. 5, 2007 [5 pages].
Amended Answer of Defendant Limelight Networks, Inc., Exhibit 1 to Defendant Limelight Network Inc.'s Combined Motion for Leave to Amend its Answer and to Compel Related Interrogatory Responses, in Civil Action No. 2:07:cv589, Sep. 9, 2008 [18 pgs.].
Claim construction Opinion and Order in Civil Action No. 2:07:cv589, Dec. 10, 2008 [51 pages].
Communications from European Patent Office in European Patent Application No. 99 906 680.6: Minutes of Oral Hearing of Nov. 20, 2008, including auxiliary requests; and Invitation under Art. 94(3) and Rule 71(1) EPC (dated Dec. 11, 2008) to amended dependent claims. [32 pgs.].

(56) References Cited

OTHER PUBLICATIONS

Declaration Kevin C. Almeroth in Support of Limelight Networks, Inc.'s Motion for Summary Judgment of Non-Infringement and Invalidity of All Patents-In-Suit, filed Aug. 28, 2008 in Civil Action No. 2:07cv589 (RGD-FBS) [39 pgs.].
Defendant Limelight Network Inc.'s Combined Motion for Leave to Amend its Answer and to Compel Related Interrogatory Responses, in Civil Action No. 2:07cv589, Sep. 9, 2008 [4 pgs].
Defendant Limelight Network Inc.'s Memorandum of Points and Authorities in Support of Its Combined Motion for Leave to Amend Its Answer and to Compel Related Interrogatory Responses (Public Version), in Civil Action No. 2:07cv589, Sep. 9, 2008 [18 pgs.].
Defendant Limelight Network Inc.'s Memorandum of Points and Authorities in Support of its Combined Motion for Leave to Amend its Answer and to Compel Related Interrogatory Responses, (Public Version, redacted) filed Sep. 9, 208, in civil action No. 2:07-cv-00589-RGD-FBS.
Defendant Limelight Network Inc.'s Rebuttal Brief in Support of Its Combined Motion for Leave to Amend its Answer and Compel Related Interrogatory Responses (Public version), filed Oct. 7, 2008 in civil action No. 2:07-cv-00589-RGD-FBS.
Defendant Limelight Network Inc.'s Supplemental Responses to Plaintiffs First Set of Interrogatories (Redacted), Apr. 21, 2008, in civil action No. 2:07-cv-00589-WDK-FBS [46 pgs.].
Defendant Limelight Networks, Inc.'s Claim Construction Brief for U.S. Patent Nos. 6,654,807; 7,054,935; and 6,473,405, filed in Civil Action No. 2:07CV589 (RGD-FBS), Jun. 27, 2008 [38 pgs.].
Defendant Limelight Networks, Inc.'s Reply Brief in Support of its Motion for Summary Judgment of Non-Infringement and Invalidity of All Patents-In-Suit, filed Oct. 1, 2008 in Civil Action No. 2:07cv589 (JBF-FBS) [21 pgs.].
Defendant Limelight Networks, Inc.'s Memorandum in Support of its Motion for Summary Judgment of Non-Infringement and Invalidity of all Patents-In-Suit, [Redacted] for Civil Action No. 2:07cv589 (RGD-FBS), Aug. 28, 2008.
Defendant Limelight Networks, Inc.'s Supplemental Responses to Plaintiff's First Set of Interrogatories (No. 2-4, 12-13, and 19) [Redacted], May 16, 2008, in civil action No. 2:07-cv-00589-WDK-FBS [70 pgs.].
Defendant Limelight Networks, Inc.'s Supplemental Responses to Plaintiff's First Set of Interrogatories (Nos. 1-11, 13-14, 17 and 19-20, [redacted] Feb. 9, 2008, in civil action No. 2:07-cv-00589-RGD-FBS [101 pgs.].
Exhibit A to Level 3 Communications, LLC's Objections and Responses to Limelight Networks. Inc.'s First Set of Interrogatories, Apr. 21, 2008, in civil action No. 2:07-cv-00589-WDK-FBS [68 pgs.].
Exhibit B to Level 3 Communications, LLC's Objections and Responses to Limelight Networks. Inc.'s First Set of Interrogatories, Apr. 21, 2008, in civil action No. 2:07-cv-00589-WDK-FBS [20 pgs.].
Exhibits A-G of Plaintiff Level 3 Communications, LLC's Memorandum of Law in Opposition to Defendant Limelight Networks, Inc.'s Combined Motion for Leave to Amend its Answer and to Compel Related Interrogatory Responses, Sep. 30, 2008, Civil Action No. 2:07cv589, (Exhibit A [7 pgs.], B [5 pgs.], C [47 pgs.], D [45 pgs.], E [7 pgs.], F [8 pgs.], G [5 pgs.]).
Exhibits A-V filed in support of Limelight Networks, Inc.'s Motion for Summary Judgment of Non-Infringement and Invalidity of All Patents-In-Suit, Aug. 28, 2008 in Civil Action No. 2:07cv589 (JBF-FBS) [277 pgs.].
Interlocutory Decision in Opposition proceedings for EPO Appln. No. 00 128 346.4-2211, Patent No. 1143337, Sep. 22, 2008.
Level 3 Communications Supplemental Exhibit A in Civil Action No. 2:07cv589 (JBF-FBS) [69 pgs.].
Level 3 Communications, LLC's Confidential Version of its Opposition Brief to Defendant's Motion for Summary Judgment of Non-Infringement and Invalidity of All Patents-In-Suit, Sep. 17, 2008, filed in Civil Action No. 2:07cv589 (JBF-FBS) [33 pgs.].

Level 3 Communications, LLC's Non-Confidential Version of its Opposition Brief to Defendant's Motion for Summary Judgment of Non-Infringement and Invalidity of all Patents-In-Suit [Redacted], in Civil Action No. 2:07cv589 (JBF-FBS), Sep. 17, 2008.
Level 3 Communications, LLC's Objections and Answers to Defendant Limelight Networks, Inc.'s Sixth Set of Interrogatories, Feb. 9, 2008, in civil action No. 2:07-cv-00589-WDK-FBS [9 pgs.].
Level 3 Communications, LLC's Objections and Answers to Defendant Limelight Networks, Inc.'s Third Set of Interrogatories, [redacted], Aug. 18, 2008, in civil action No. 2:07-cv-00589-WDK-FBS [10 pgs].
Level 3 Communications, LLC's Objections and Responses to Limelight Networks. Inc.'s First Set of Interrogatories, [redacted] Apr. 21, 2008, in civil action No. 2:07-cv-00589-WDK-FBS [28 pgs].
Level 3 Communications, LLC's Second Supplemental Response to Limelight Networks, Inc.'s First Set of Interrogatories (No. 15), Nov. 2, 2008 in civil action No. 2:07-cv-00589-RGD-FBS [9 pgs.].
Level 3 Communications, LLC's Second Supplemental Response to Limelight Networks, Inc.'s First Set of Interrogatories (No. 4) [Redacted], Nov. 3, 2008 in civil action No. 2:07-cv-00589-RGD-FBS [8 pgs.].
Level 3 Communications, LLC's Supplemental Responses to Limelight Networks, Inc.'s First Set of Interrogatories (No. 10) [Redacted], Jun. 11, 2008 in civil action No. 2:07-cv-00589-RGD-FBS [6 pgs.].
Level 3 Communications, LLC's Supplemental Responses to Limelight Networks, Inc.'s First Set of Interrogatories (Nos. 14 and 15) [Redacted], May 30, 2008 in civil action No. 2:07-cv-00589-RGD-FBS [10 pgs.].
Level 3's Memorandum of Law in Reply to Limelight's Claim Construction Brief for U.S. Patent Nos. 6,654,807; 7,054,935; and 6,473,405, in Civil Action No. 2:07CV589, Jul. 3, 2008 [84 pgs.].
Level 3's Memorandum of Law in Reply to Limelight's Claim Construction Brief, in Civil File No. 2:07CV589, Jul. 3, 2008.
Memorandum of Law in Support of Level 3's Proposed Claim Constructions, from Case No. 2:07cv589 RDG FBS, Jun. 13, 2008.
Memorandum on Markman terms to: Judge Robert G. Doumar, Counsel for Level 3 Communications, Counsel for Limelight from: Court appointed technical expert, Professor Ellen W. Zegura Re: Definition of terms, in civil action No. 2:07-cv-00589-MSD-FBS, *Level 3 Communications, LLC v. Limelight Networks, Inc.* (Aug. 2008).
Minutes of Oral Proceedings Appln. No. 00 128 346.4-2211, Patent No. 1143337, Sep. 22, 2008.
Order from Judge Doumar in civil action No. 2:07-cv-00589-MSD-FBS, *Level 3 Communications, LLC v. Limelight Networks, Inc.* instructing Court-Appointed Expert, Professor Ellen W. Zegura Re: Definition of claim terms, Jul. 25, 2008, [2 pgs.].
Plaintiff Level 3 Communications, LLC's Memorandum of Law in Opposition to Defendant Limelight Networks, Inc.'s Combined Motion for Leave to Amend its Answer and to Compel Related Interrogatory Responses, Sep. 30, 2008, Civil Action No. 2:07cv589, [31 pages].
Response to Summons of May 30, 2008 filed in European Patent Office for European Application No. 99 906 680.6 on Oct. 20, 2008.
Transcript of 30(b)(6) Deposition of Kevin F. Delgadillo, Tuesday, Sep. 9, 2008 in Civil Action No. 2:07cv589 [39 pages].
Transcript of Deposition of Maurice Andrew Collins, Sep. 9, 2008 in Civil Action No. 2:07CV589 [136 pgs.].
Opinion and Order from U.S. District Judge Mark. S. Davis in Civil Action No. 2:07cv589, denying Defendant LimeLight Networks Inc.'s Motion for Summary Judgment, Norfolk, VA, Dec. 29, 2008.
Combined Petition for Panel Rehearing or Rehearing EN BANC, U.S. Ct. Appeals for Federal Circuit, *Level 3 Communications LLC* vs. *Limelight Networks, Inc.*, 2009-1480, Jun. 4, 2010 [22 pgs.].
Communication dated Apr. 27, 2010 from European Patent Office re Opposition to European Patent application No. (99906680.6-2211) Patent No. 1 053 524 B [1 pg.].
Defendant Limelight Networks, Inc.'s Claim Construction Brief for U.S. Patent Nos. 6,654,807; 7,054,935 and 6,473,405, in Civil Action No. 2:07cv589, Jun. 27, 2008, with Exhibits 1-24 [333 pgs.].

(56) References Cited

OTHER PUBLICATIONS

Exhibit 56 to Deposition of Maurice Andrew Collins in Civil Action No. 2:07cv589 (WDK-FBS), "Defendant Limelight Networks, Inc.'s Notice of Deposition of Andrew Collins," Aug. 29, 2008 [28 pgs.].
Exhibit 57 to Deposition of Maurice Andrew Collins in Civil Action No. 2:07cv589 (WDK-FBS), Document titled "Detour: Informed Internet Routing and Transport," Savage, et al., IEEE Micro, vol. 19, issue 1, pp. 50-59, Jan./Feb. 1999 [10 pgs.].
Exhibit 58 to Deposition of Maurice Andrew Collins in Civil Action No. 2:07cv589 (WDK-FBS), document titled Internet Archive Wayback Machine, sample search Sep. 9, 2008 [1 pg.].
Exhibit 59 to Deposition of Maurice Andrew Collins in Civil Action No. 2:07cv589 (WDK-FBS), Document titled "Detour," deponent Collins, Sep. 9, 2008, [1 pg.].
Exhibit 65 to Deposition of Kevin F. Delgadillo, Sep. 9, 2008, in Civil Action No. 2:07cv589 (WDK-FBS), Document titled Subpoena in a Civil Case [12 pgs.].
Exhibit 66 to Deposition of Kevin F. Delgadillo, Sep. 9, 2008, in Civil Action No. 2:07cv589 (WDK-FBS), Document titled, "Cisco DistributedDirector," [9 pgs.].
Exhibit 67 to Deposition of Kevin F. Delgadillo, Sep. 9, 2008, in Civil Action No. 2:07cv589 (WDK-FBS), Document titled, "Electronic Publishing Form," dated Nov. 27, 1996 [5 pgs.].
Exhibit 68 to Deposition of Kevin F. Delgadillo, Sep. 9, 2008, in Civil Action No. 2:07cv589 (WDK-FBS), Email from Kevin Delgadillo, dated Jul. 19, 1996 [1 pg.].
Exhibit 69 to Deposition of Kevin F. Delgadillo, Sep. 9, 2008, in Civil Action No. 2:07cv589 (WDK-FBS), Document titled, "Cisco Advantage: Leveraging Intranet and Internet Productivity." [9 pgs.].
Letter from Chris Hirsz dated Apr. 22, 2010 to European Patent Office forwarding Statement of Opposition to European Patent No. 1 053 524 B in the name of Level 3 CDN International, Inc. filed in European Patent Office by Akamai Technologies, Inc., Apr. 22, 2004 [2 pgs.].
Limelight Networks Inc.'s Response to the Report of Professor Ellen W. Zegura, Sep. 5, 2008, in Civil Action No. 2:07cv589 (WDK-FBS) [5 pgs.].
Notice of Abandonment from Canadian Intellectual Property Office for Canadian Patent Application No. 2,320,261 [1 pg.].
Office Action (Notice of Reasons for Rejection) in Japanese Patent Appln. No. 2007-212908, Mar. 30, 2010, JPO [3 pgs.] with summary English translation [3 pgs.].
Office Action dated Sep. 24, 2007 from Canadian Intellectual Property Office for Canadian Patent Application No. 2,320,261 [5 pgs.].
Office Action dated Sep. 28, 2006 from Canadian Intellectual Property Office for Canadian Patent Application No. 2,320,261 [4 pgs.].
Opening Brief of Appellant Level 3 Communications, LLC, U.S. Ct. Appeals for Federal Circuit, *Level 3 Communications LLC* vs. *Limelight Networks, Inc.*, 2009-1480, Oct. 5, 2009 [106 pgs.].
Opinion and Order from U.S. District Judge Mark. S. Davis in Civil Action No. 2:07cv589, ruling on Level 3 Communications, LLC's post-trial motions, Norfolk, VA, Jun. 23, 2009 [26 pgs.].
Reinstatement and Response, filed Apr. 24, 2009 in Canadian Intellectual Property Office for Canadian Patent Application No. 2,320,261 [18 pgs.].
Reply Brief of Appellant Level 3 Communications, LLC, U.S. Ct. Appeals for Federal Circuit, *Level 3 Communications LLC* vs. *Limelight Networks, Inc.*, 2009-1480, Feb. 2, 2010 [41 pgs.].
Response Brief of Defendant-Appellee Limelight Networks, Inc., U.S. Ct. Appeals for Federal Circuit, *Level 3 Communications LLC* vs. *Limelight Networks, Inc.*, 2009-1480, Jan. 19, 2010 [72 pgs.].
Response to Office Action, filed Mar. 28, 2007 in Canadian Intellectual Property Office for Canadian Patent Application No. 2,320,261 [24 pgs.].
Statement of Opposition to European Patent No. 1 053 524 B in the name of Level 3 CDN International, Inc. filed in European Patent Office by Akamai Technologies, Inc., Apr. 22, 2004 [40 pgs.].
Transcript of Deposition of Kevin C. Almeroth, Civil Action No. 2:07cv589 (RGD-FBS) (E.D. Va.), Sep. 11, 2008 (redacted) [98 pgs.].
Transcript of Federal Circuit Oral Argument, *Level 3 Communications LLC* vs. *Limelight*, Monday, May 3, 2010 [14 pgs.].
Transcript of Oral Argument, U.S. Ct. Appeals for Federal Circuit, *Level 3 Communications LLC* vs. *Limelight*, Monday, May 3, 2010 [14 pgs.].
Transcript of Proceedings, Hearing before Hon. Mark S. Davis, U.S. District Judge, in Civil Action No. 2:07cv589 (E.D. Va.), Oct. 23, 2008 [62 pgs.].
U.S. Ct. Appeals for Fed. Circuit, 2009-1490, *Level 3 Communications, LLC* v. *Limelight Networks, Inc.*, Judgment Affirmed, Fed. Cir. R. 36, May 5, 2010 [2 pgs.].
Yokohashi, Takao, System Architectonic Solaris2.x, 26th, UNIX User, Japan, Softbank Corp., Jan. 1, 1998, vol. 7, No. 1, p. 89-96.
European Patent Office (EPO) Summons to attend oral proceedings pursuant to Rule 115(1) EPC, dated Aug. 4, 2011, for European Patent No. 99906680.6, including accompanying communication (EPO Form 2906), "Facts & Submissions" [20 pgs.].
*Akamai Tech., Inc.* v. *Cable & Wireless Internet Svs., Inc.*, 344 F.3d 1186, 68 USPQ2d 1186 (Fed. Cir. 2003) [Sep. 15, 2003].
European Patent Office (EPO), European Search Report mailed Aug. 19, 2010 in European Appln. No. 08005349.9 [10 pgs.].
"Memorandum in Support of Level 3's Motion in Limine to Preclude Limelight Witnesses from Referring to Prosecution History in Rendering Non-Infringement Opinions," filed in Civil Action No. 2:07cv589 (MSD-FBS), U.S. Dist. Ct. E.D. Va., Jan. 15, 2009 [7 pgs.].
"Memorandum in Support of Limelight's Motion in Limine No. 7 to Exclude Testimony From Level 3's Experts Not Disclosed in Their Expert Reports Regarding the Disclosures of the Patents-In-Suit," filed in Civil Action No. 2:07cv589 (MSD-FBS), U.S. Dist. Ct. E.D. Va., Dec. 4, 2008 [6 pgs.].
Level 3 Communications, LLC's Supplemental Responses to Limelight Networks, Inc.'s First Set of Interrogatories (No. 4), in civil action No. 2:07-cv-00589-RGD-FBS, in U.S. Dist. Ct. E.D. Va., Sep. 3, 2008 [8 pgs.].
Order denying Appellant's Petition for Panel Rehearing or Rehearing EN BANC, U.S. Ct. Appeals for Federal Circuit, *Level 3 Communications LLC* vs. *Limelight Networks, Inc.*, 2009-1480, Jun. 29, 2010 [2 pgs.].
Plaintiff Level 3 Communications, LLC's Response to Defendant Limelight Networks, Inc.'S Response to Report of Professor Ellen Zegura, Sep. 9, 2008, in Civil Action No. 2:07cv589 (WDK-FBS) [5 pgs.].
Transcript of Proceedings (Motion for Summary Judgment), in Civil Action No. 2:07cv589 in U.S. Dist. Ct. E.D. Va., Norfolk, Va., Dec. 18, 2008, [145 pgs.].
Partial European Search Report and Section 6.2, EPO communication dated Oct. 18, 2012 in EP Application No. 07024629.3.
EPO, Annex to Minutes of the Oral Proceedings Before the Opposition Division, Claims of Main Request and new first (noted as IV) and second Auxiliary Request (noted as II), Apr. 24, 2012, European Application No. 99 906 680.6, patent No. EP-B-1053524 [22 pgs.].
EPO, Interlocutory Decision in Opposition Proceedings, Allowed text for re-granted patent, Apr. 24, 2012, European Application No. 99 906 680.6, patent No. EP-B-1053524, European patent No. EP-B-1 053 524 [29 pgs.].
EPO, Interlocutory Decision in Opposition Proceedings, Apr. 24, 2012, European Application No. 99 906 680.6, patent No. EP-B-1053524 [2 pgs.] and enclosures.
EPO, Interlocutory Decision in Opposition Proceedings, Grounds for Decision, Apr. 24, 2012, European Application No. 99 906 680.6, patent No. EP-B-1053524 [8 pgs.].
EPO, Minutes of the Oral Proceedings Before the Opposition Division, published Apr. 24, 2012, proceedings held Mar. 6, 2012, European Application No. 99 906 680.6, patent No. EP-B-1053524 [12 pgs.].
European Patent Office (EPO) Communication (examination report) dated Jun. 15, 2012 from EP08005349.9 [6 pgs.].
European Patent Office (EPO) Communication (search report) dated Jul. 4, 2012 from EP07024629.3 [4 pgs.].

\* cited by examiner

METHOD OF GENERATING A WEB PAGE

CROSS REFERENCE TO RELATED APPLICATIONS

This application is a continuation of pending U.S. patent application Ser. No. 11/441,253, filed May 26, 2006, which is a continuation of U.S. patent application Ser. No. 11/065,412, filed Feb. 23, 2005, pending, which is a continuation of U.S. patent application Ser. No. 09/612,598, filed Jul. 7, 2000, abandoned, which is a division of U.S. patent application Ser. No. 09/021,506, filed Feb. 10, 1998, patented as U.S. Pat. No. 6,185,598, the contents of each of which are hereby fully incorporated herein by reference. This application is a continuation of U.S. patent application Ser. No. 11/065,412, filed Feb. 23, 2005, pending, which is a continuation of U.S. patent application Ser. No. 09/612,598, filed Jul. 7, 2000, abandoned, which is a division of U.S. patent application Ser. No. 09/021,506, filed Feb. 10, 1998, patented as U.S. Pat. No. 6,185,598.

FIELD OF THE INVENTION

This invention relates to replication of resources in computer networks.

BACKGROUND OF THE INVENTION

The advent of global computer networks, such as the Internet, have led to entirely new and different ways to obtain information. A user of the Internet can now access information from anywhere in the world, with no regard for the actual location of either the user or the information. A user can obtain information simply by knowing a network address for the information and providing that address to an appropriate application program such as a network browser.

The rapid growth in popularity of the Internet has imposed a heavy traffic burden on the entire network. Solutions to problems of demand (e.g., better accessibility and faster communication links) only increase the strain on the supply. Internet Web sites (referred to here as "publishers") must handle ever-increasing bandwidth needs, accommodate dynamic changes in load, and improve performance for distant browsing clients, especially those overseas. The adoption of content-rich applications, such as live audio and video, has further exacerbated the problem.

To address basic bandwidth growth needs, a Web publisher typically subscribes to additional bandwidth from an Internet service provider (ISP), whether in the form of larger or additional "pipes" or channels from the ISP to the publisher's premises, or in the form of large bandwidth commitments in an ISP's remote hosting server collection. These increments are not always as fine-grained as the publisher needs, and quite often lead times can cause the publisher's Web site capacity to lag behind demand.

To address more serious bandwidth growth problems, publishers may develop more complex and costly custom solutions. The solution to the most common need, increasing capacity, is generally based on replication of hardware resources and site content (known as mirroring), and duplication of bandwidth resources. These solutions, however, are difficult and expensive to deploy and operate. As a result, only the largest publishers can afford them, since only those publishers can amortize the costs over many customers (and Web site hits).

A number of solutions have been developed to advance replication and mirroring. In general, these technologies are designed for use by a single Web site and do not include features that allow their components to be shared by many Web sites simultaneously.

Some solution mechanisms offer replication software that helps keep mirrored servers up-to-date. These mechanisms generally operate by making a complete copy of a file system. One such system operates by transparently keeping multiple copies of a file system in synch. Another system provides mechanisms for explicitly and regularly copying files that have changed. Database systems are particularly difficult to replicate, as they are continually changing. Several mechanisms allow for replication of databases, although there are no standard approaches for accomplishing it. Several companies offering proxy caches describe them as replication tools. However, proxy caches differ because they are operated on behalf of clients rather than publishers.

Once a Web site is served by multiple servers, a challenge is to ensure that the load is appropriately distributed or balanced among those servers. Domain name-server-based round-robin address resolution causes different clients to be directed to different mirrors.

Another solution, load balancing, takes into account the load at each server (measured in a variety of ways) to select which server should handle a particular request.

Load balancers use a variety of techniques to route the request to the appropriate server. Most of those load-balancing techniques require that each server be an exact replica of the primary Web site. Load balancers do not take into account the "network distance" between the client and candidate mirror servers.

Assuming that client protocols cannot easily change, there are two major problems in the deployment of replicated resources. The first is how to select which copy of the resource to use. That is, when a request for a resource is made to a single server, how should the choice of a replica of the server (or of that data) be made. We call this problem the "rendezvous problem". There are a number of ways to get clients to rendezvous at distant mirror servers. These technologies, like load balancers, must route a request to an appropriate server, but unlike load balancers, they take network performance and topology into account in making the determination.

A number of companies offer products which improve network performance by prioritizing and filtering network traffic.

Proxy caches provide a way for client aggregators to reduce network resource consumption by storing copies of popular resources close to the end users. A client aggregators is an Internet service provider or other organization that brings a large number of clients operating browsers to the Internet. Client aggregators may use proxy caches to reduce the bandwidth required to serve web content to these browsers. However, traditional proxy caches are operated on behalf of Web clients rather than Web publishers.

Proxy caches store the most popular resources from all publishers, which means they must be very large to achieve reasonable cache efficiency. (The efficiency of a cache is defined as the number of requests for resources which are already cached divided by the total number of requests.)

Proxy caches depend on cache control hints delivered with resources to determine when the resources should be replaced. These hints are predictive, and are necessarily often incorrect, so proxy caches frequently serve stale data. In many cases, proxy cache operators instruct their proxy to ignore hints in order to make the cache more efficient, even though this causes it to mote frequently serve stale data.

Proxy caches hide the activity of clients from publishers. Once a resource is cached, the publisher has no way of knowing how often it was accessed from the cache.

SUMMARY OF THE INVENTION

This invention provides a way for servers in a computer network to off-load their processing of requests for selected resources by determining a different server (a "repeater") to process those requests. The selection of the repeater can be made dynamically, based on information about possible repeaters.

If a requested resource contains references to other resources, some or all of these references can be replaced by references to repeaters.

Accordingly, in one aspect, this invention is a method of processing resource requests in a computer network. First a client makes a request for a particular resource from an origin server, the request including a resource identifier for the particular resource, the resource identifier sometimes including an indication of the origin server. Requests arriving at the origin server do not always include an indication of the origin server; since they are sent to the origin server, they do not need to name it. A mechanism referred to as a reflector, co-located with the origin server, intercepts the request from the client to the origin server and decides whether to reflect the request or to handle it locally. If the reflector decides to handle the request locally, it forwards it to the origin server, otherwise it selects a "best" repeater to process the request. If the request is reflected, the client is provided with a modified resource identifier designating the repeater.

The client gets the modified resource identifier from the reflector and makes a request for the particular resource from the repeater designated in the modified resource identifier.

When the repeater gets the client's request, it responds by returning the requested resource to the client. If the repeater has a local copy of the resource then it returns that copy, otherwise it forwards the request to the origin server to get the resource, and saves a local copy of the resource in order to serve subsequent requests.

The selection by the reflector of an appropriate repeater to handle the request can be done in a number of ways. In the preferred embodiment, it is done by first pre-partitioning the network into "cost groups" and then determining which cost group the client is in. Next, from a plurality of repeaters in the network, a set of repeaters is selected, the members of the set having a low cost relative to the cost group which the client is in. In order to determine the lowest cost, a table is maintained and regularly updated to define the cost between each group and each repeater. Then one member of the set is selected, preferably randomly, as the best repeater.

If the particular requested resource itself can contain identifiers of other resources, then the resource may be rewritten (before being provided to the client). In particular, the resource is rewritten to replace at least some of the resource identifiers contained therein with modified resource identifiers designating a repeater instead of the origin server. As a consequence of this rewriting process, when the client requests other resources based on identifiers in the particular requested resource, the client will make those requests directly to the selected repeater, bypassing the reflector and origin server entirely.

Resource rewriting must be performed by reflectors. It may also be performed by repeaters, in the situation where repeaters "peer" with one another and make copies of resources which include rewritten resource identifiers that designate a repeater.

In a preferred embodiment, the network is the Internet and the resource identifier is a uniform resource locator (URL) for designating resources on the Internet, and the modified resource identifier is a URL designating the repeater and indicating the origin server (as described in step B3 below), and the modified resource identifier is provided to the client using a REDIRECT message. Note, only when the reflector is "reflecting" a request is the modified resource identifier provided using a REDIRECT message.

In another aspect, this invention is a computer network comprising a plurality of origin servers, at least some of the origin servers having reflectors associated therewith, and a plurality of repeaters.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

Overview

Figure 1:
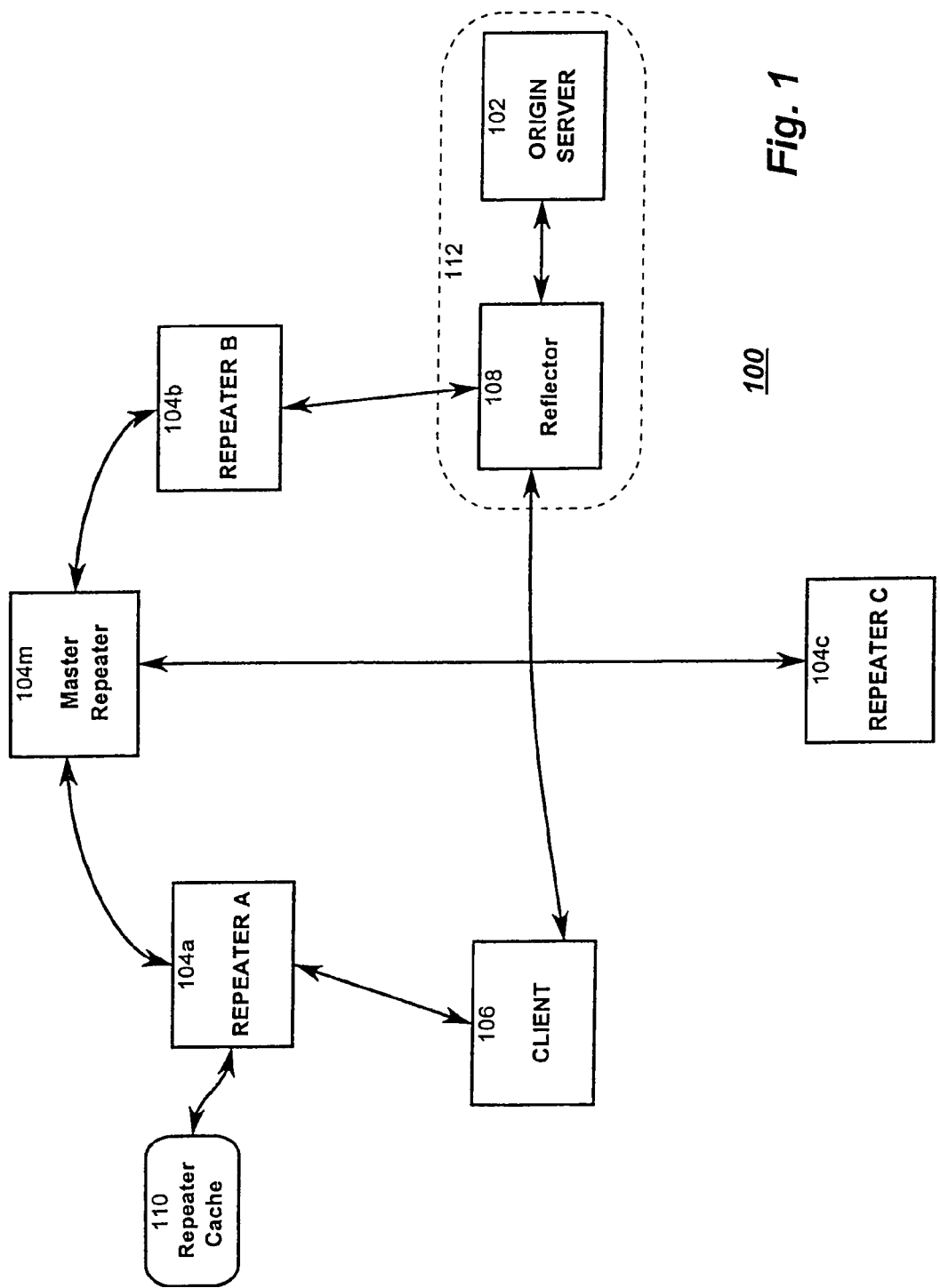
FIG. 1 depicts a portion of a network environment according to the present invention.

FIG. 1 shows a portion of a network environment 100 according to the present invention, wherein a mechanism (reflector 108, described in detail below) at a server (herein origin server 102) maintains and keeps track of a number of partially replicated servers or repeaters 104a, 104b, and 104c. Each repeater 104a, 104b, and 104c replicates some or all of the information available on the origin server 102 as well as information available on other origin servers in the network 100. Reflector 108 is connected to a particular repeater known as its "contact" repeater ("Repeater B" 104b in the system depicted in FIG. 1). Preferably each reflector maintains a connection with a single repeater known as its contact, and each repeater maintains a connection with a special repeater known as its master repeater (e.g., repeater 104m for repeaters 104a, 104b and 104c in FIG. 1).

Thus, a repeater can be considered as a dedicated proxy server that maintains a partial or sparse mirror of the origin server 102, by implementing a distributed coherent cache of the origin server. A repeater may maintain a partial) mirror of more than one origin server. In some embodiments, the network 100 is the Internet and repeaters mirror selected resources provided by origin servers in response to clients' HTTP (hypertext transfer protocol) and FTP (file transfer protocol) requests.

A client 106 connects, via the network 100, to origin server 102 and possibly to one or more repeaters 104a etc.

Origin server 102 is a server at which resources originate. More generally, the origin server 102 is any process or collection of processes that provide resources in response to requests from a client 106. Origin server 102 can be any off-the-shelf Web server. In a preferred embodiment, origin server 102 is typically a Web server such as the Apache server or Netscape Communications Corporation's Enterprise™ server.

Client 106 is a processor requesting resources from origin server 102 on behalf of an end user. The client 106 is typically a user agent (e.g., a Web browser such as Netscape Communications Corporation's Navigator™) or a proxy for a user agent. Components other than the reflector 108 and the repeaters 104a, 104b, etc., may be implemented using commonly available software programs. In particular, this invention works with any HTTP) client (e.g., a Web browser), proxy cache, and Web server. In addition, the reflector 108 might be fully integrated into the data server 112 (for instance, in a Web Server). These components might be loosely integrated based on the use of extension mechanisms (such as so-called add-in modules) or tightly integrated by modifying the service component specifically to support the repeaters.

Resources originating at the origin server 102 may be static or dynamic. That is, the resources may be fixed or they may be created by the origin server 102 specifically in response to a request. Note that the terms "static" and "dynamic" are relative, since a static resource may change at some regular, albeit long, interval.

Resource requests from the client 106 to the origin server 102 are intercepted by reflector 108 which for a given request either forwards the request on to the origin server 102 or conditionally reflects it to some repeater 104a, 104b, etc. in the network 100. That is, depending on the nature of the request by the client 106 to the origin server 102, the reflector 108 either serves the request locally (at the origin server 102), or selects one of the repeaters (preferably the best repeater for the job) and reflects the request to the selected repeater. In other words, the reflector 108 causes requests for resources from origin server 102, made by client 106, to be either served locally by the origin server 102 or transparently reflected to the best repeater 104a, 104b, etc. The notion of a best repeater and the manner in which the best repeater is selected are described in detail below.

Repeaters 104a, 104b, etc. are intermediate processors used to service client requests thereby improving performance and reducing costs in the manner described herein. Within repeaters 104a, 104b, etc., are any processes or collections of processes that deliver resources to the client 106 on behalf of the origin server 102. A repeater may include a repeater cache 110, used to avoid unnecessary transactions with the origin server 102.

The reflector 108 is a mechanism, preferably a software program, that intercepts requests that would normally be sent directly to the origin server 102. While shown in the drawings as separate components, the reflector 108 and the origin server 102 are typically co-located, e.g., on a particular system such as data server 112. (As discussed below, the reflector 108 may even be a "plug in" module that becomes part of the origin server 102.

FIG. 1 shows only a part of a network 100 according to this invention. A complete operating network consists of any number of clients, repeaters, reflectors, and origin servers. Reflectors communicate with the repeater network, and repeaters in the network communicate with one another.

Uniform Resource Locators

Each location in a computer network has an address which can generally be specified as a series of names or numbers. In order to access information, an address for that information must be known. For example, on the World Wide Web ("the Web") which is a subset of the Internet, the manner in which information address locations are provided has been standardized into Uniform Resource Locators (URLs). URLs specify the location of resources (information, data files, etc.) on the network.

The notion of URLs becomes even more useful when hypertext documents are used. A hypertext document is one which includes, within the document itself, links (pointers or references) to the document itself or to other documents. For example, in an on-line legal research system, each case may be presented as a hypertext document. When other cases are cited, links to those cases can be provided. In this way, when a person is reading a case, they can follow cite links to read the appropriate parts of cited cases.

In the case of the Internet in general and the World Wide Web specifically, documents can be created using a standardized form known as the Hypertext Markup Language (HTML). In HTML, a document consists of data (text, images, sounds, and the like), including links to other sections of the same document or to other documents. The links are generally provided as URLs, and can be in relative or absolute form. Relative URLs simply omit the parts of the URL which are the same as for the document including the link, such as the address of the document (when lining to the same document), etc. In general, a browser program will fill in missing parts of a URL using the corresponding parts from the current document, thereby forming a fully formed URL including a fully qualified domain name, etc.

A hypertext document may contain any number of links to other documents, and each of those other documents may be on a different server in a different part of the world. For example, a document may contain links to documents in Russia, Africa, China and Australia. A user viewing that document at a particular client can follow any of the links transparently (i.e., without knowing where the document being linked to actually resides). Accordingly, the cost (in terms of time or money or resource allocation) of following one link versus another may be quite significant.

URLs generally have the following form (defined in detail in T. Berners-Lee et al, *Uniform Resource Locators (URL)*, Network Working Group, Request for Comments: 1738, Category: Standards Track, December 1994, located at "http://ds.internic.net/rfc/rfc1738.txt", which is hereby incorporated herein by reference):

scheme://host[:port]/url-path where "scheme" can be a symbol such as "file" (for a file on the local system), "ftp" (for a file on an anonymous FTP file server), "http" (for a file on a file on a Web server), and "telnet" (for a connection to a Telnet-based service). Other schemes, can also be used and new schemes are added every now and then. The port number is optional, the system substituting a default port number (depending on the scheme) if none is provided. The "host" field maps to a particular network address for a particular computer. The "url-path" is relative to the computer specified in the "host" field. A url-path is typically, but not necessarily, the pathname of a file in a web server directory.

For example, the following is a URL identifying a file "F" in the path "A/B/C" on a computer at "www.uspto.gov":

http://www.uspto.gov/A/B/C/F

In order to access the file "F" (the resource) specified by the above URL, a program (e.g., a browser) running on a user's computer (i.e., a client computer) would have to first locate the computer (i.e., a server computer) specified by the host name. I.e., the program would have to locate the server "www.uspto.gov". To do this, it would access a Domain Name Server (DNS), providing the DNS with the host name ("www.uspto.gov"). The DNS acts as a kind of centralized directory for resolving addresses from names. If the DNS determines that there is a (remote server) computer corresponding to the name "www.uspto.gov", it will provide the program with an actual computer network address for that server computer. On the Internet this is called an Internet Protocol (or IP) address and it has the form "123.345.456.678". The program on the user's (client) computer would then use the actual address to access the remote (server) computer.

The program opens a connection to the HTTP server (Web server) on the remote computer "www.uspto.gov" and uses the connection to send a request message to the remote computer (using the HTTP scheme). The message is typically an HTTP GET request which includes the url-path of the requested resource, "A/B/C/F". The HTTP server receives the request and uses it to access the resource specified by the url-path "A/B/C/F". The server returns the resource over the same connection.

Thus, conventionally HTTP client requests for Web resources at an origin server 102 are processed as follows (see FIG. 2) (This is a description of the process when no reflector 108 is installed):

- A1. A browser (e.g., Netscape's Navigator) at the client receives a resource identifier (i.e., a URL) from a user.
- A2. The browser extracts the host (origin server) name from the resource identifier, and uses a domain name server (DNS) to look up the network (IP) address of the corresponding server. The browser also extracts a port number, if one is present, or uses a default port number (the default port number for http requests is 80).
- A3. The browser uses the server's network address and port number to establish a connection between the client 106 and the host or origin server 102.
- A4. The client 106 then sends a (GET) request over the connection identifying the requested resource.
- A5. The origin server 102 receives the request and
- A6. locates or composes the corresponding resource.
- A7. The origin server 102 then sends back to the client 106 a reply containing the requested resource (or some form of error indicator if the resource is unavailable). The reply is sent to the client over the same connection as that on which the request was received from the client.
- A8. The client 106 receives the reply from the origin server 102.

There are many variations of this basic model. For example, in one variation, instead of providing the client with the resource, the origin server can tell the client to re-request the resource by another name. To do so, in A7 the server 102 sends back to the client 106 a reply called a "REDIRECT" which contains a new URL indicating the other name. The client 106 then repeats the entire sequence, normally without any user intervention, this time requesting the resource identified by the new URL.

System Operation

In this invention reflector 108 effectively takes the place of an ordinary Web server or origin server 102. The reflector 108 does this by taking over the origin server's IP address and port number. In this way, when a client tries to connect to the origin server 102, it will actually connect to the reflector 108. The original Web server (or origin server 102) must then accept requests at a different network (IP) address, or at the same IP address but on a different port number. Thus, using this invention, the server referred to in A3-A7 above is actually a reflector 108.

Note that it is also possible to leave the origin server's network address as it is and to let the reflector run at a different address or on a different port. In this way the reflector does not intercept requests sent to the origin server, but can still be sent requests addressed specifically to the reflector. Thus the system can be tested and configured without interrupting its normal operation.

Figure 3:
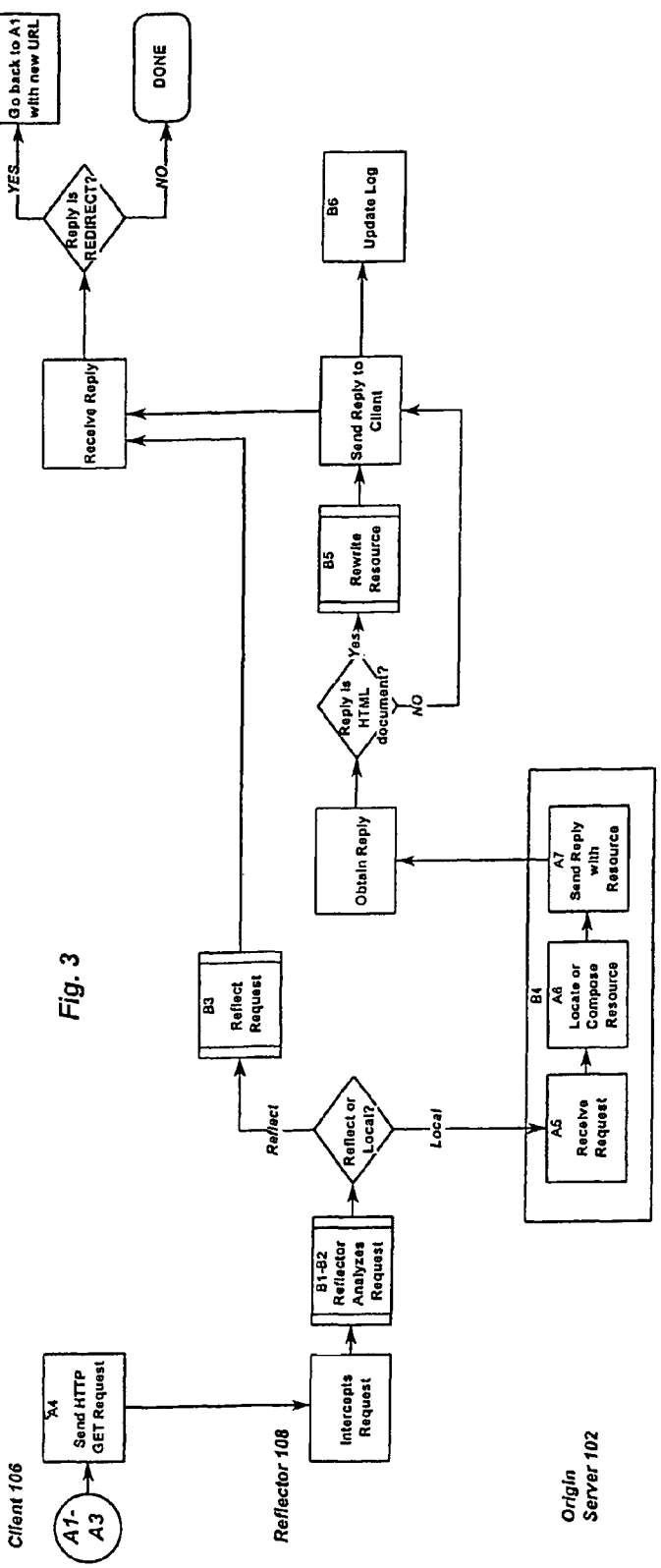

The reflector 108 supports the processing as follows (see FIG. 3):

upon receipt of a request,

- B1 The reflector 108 analyzes the request to determine whether or not to reflect the request. To do this, first the reflector determines whether the sender (client 106) is a browser or a repeater. Requests issued by repeaters must be served locally by the origin server 102. This determination can be made by looking up the network (IP) address of the sender in a list of known repeater network (IP) addresses. Alternatively, this determination could be made by attaching information to a request to indicate that the request is from a specific repeater, or repeaters can request resources from a special port other than the one used for ordinary clients.
- B2 If the request is not from a repeater, the reflector looks up the requested resource in a table (called the "rule base") to determine whether the resource requested is "repeatable". Based on this determination, the reflector either reflects the request (B3, described below) or serves the request locally (B4, described below).

The rule base is a list of regular expressions and associated attributes. (Regular expressions are well-known in the field of computer science. A small bibliography of their use is found in *Aho*, et al., "Compilers, Principles, techniques and tools", Addison-Wesley, 1986, pp. 157-158.) The resource identifier (URL) for a given request is looked up in the rule base by matching it sequentially with each regular expression. The first match identifies the attributes for the resource, namely repeatable or local. If there is no match in the rule base, a default attribute is used. Each reflector has its own rule base, which is manually configured by the reflector operator.

Figure 4:
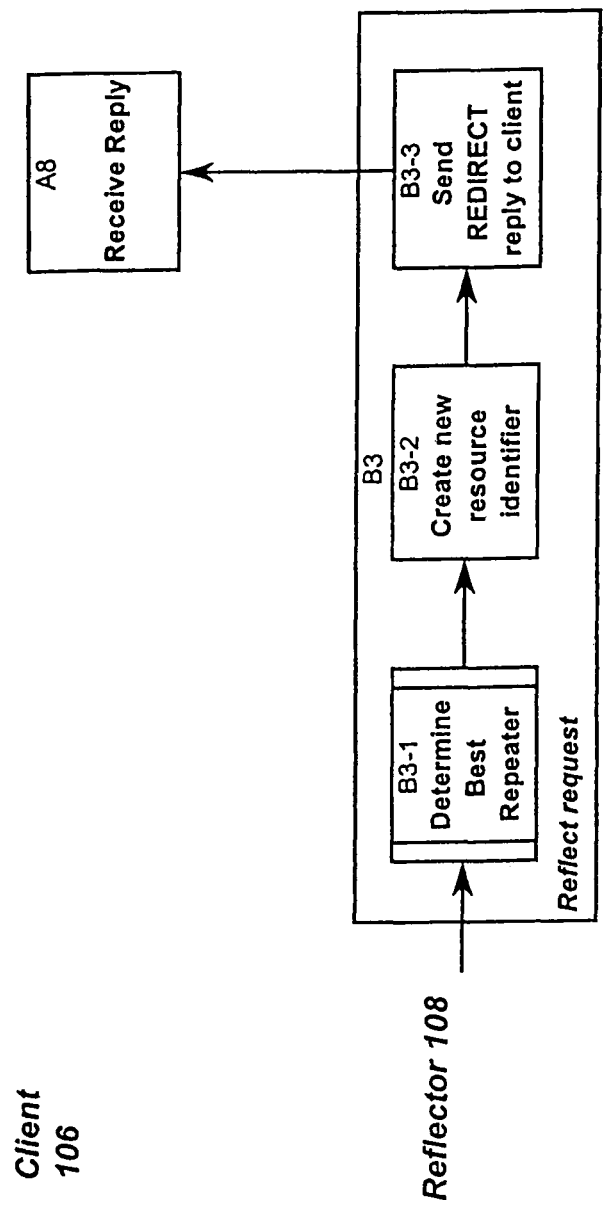

- B3. To reflect a request, (to serve a request locally go to B4), as shown in FIG. 4, the reflector determines (B3-1) the best repeater to reflect the request to, as described in detail below. The reflector then creates (B3-2) a new resource identifier (URL) (using the requested URL and the best repeater) that identifies the same resource at the selected repeater.

It is necessary that the reflection step create a single URL containing the URL of the original resource, as well as the identity of the selected repeater. A special form of URL is created to provide this information. This is done by creating a new URL as follows:

- D1. Given a repeater name, scheme, origin server name and path, create a new URL. If the scheme is "http", the preferred embodiment uses the following format:

http://<repeater>/<server>/<path>

If the form used is other than "http", the preferred embodiment uses the following format:

http://<repeater>/<server>@proxy=<scheme>@/<path>

The reflector can also attach a MIME type to the request, to cause the repeater to provide that MIME type with the result. This is useful because many protocols (such as FTP) do not provide a way to attach a MIME type to a resource. The format is http://<repeater>/<server>@proxy=<scheme>:<type>@/<path>

This URL is interpreted when received by the repeater.

The reflector then sends (B3-3) a REDIRECT reply containing this new URL to the requesting client. The HTTP REDIRECT command allows the reflector to send the browser a single URL to retry the request.

B4. To serve a request locally, the request is sent by the reflector to ("forwarded to") the origin server 102. In this mode, the reflector acts as a reverse proxy server. The origin server 102 processes the request in the normal manner (A5-A7). The reflector then obtains the origin server's reply to the request which it inspects to determine if the requested resource is an HTML document, i.e., whether the requested resource is one which itself contains resource identifiers.

B5. If the resource is an HTML document then the reflector rewrites the HTML document by modifying resource identifiers (URLs) within it, as described below. The resource, possibly as modified by rewriting, is then returned in a reply to the requesting client 106.

If the requesting client is a repeater, the reflector may temporarily disable any cache-control modifiers which the origin server attached to the reply. These disabled cache-control modifiers are later re-enabled when the content is served from the repeater. This mechanism makes it possible for the origin server to prevent resources from being cached at normal proxy caches, without affecting the behavior of the cache at the repeater.

B6. Whether the request is reflected or handled locally, details about the transaction, such as the current time, the address of the requester, the URL requested, and the type of response generated, are written by the reflector to a local log file.

By using a rule base (B2), it is possible to selectively reflect resources. There are a number of reasons that certain particular resources cannot be effectively repeated (and therefore should not be reflected), for instance:

the resource is composed uniquely for each request;
the resource relies on a so-called cookie (browsers will not send cookies to repeaters with different domain names);
the resource is actually a program (such as a Java applet) that will run on the client and that wishes to connect to a service Java requires that the service be running on the same machine that provided the applet).

In addition, the reflector 108 can be configured so that requests from certain network addresses (e.g., requests from clients on the same local area network as the reflector itself) are never reflected. Also, the reflector may choose not to reflect requests because the reflector is exceeding its committed aggregate information rate, as described below.

A request which is reflected is automatically mirrored at the repeater when the repeater receives and processes the request.

The combination of the reflection process described here and the caching process described below effectively creates a system in which repeatable resources are migrated to and mirrored at the selected reflector, while non-repeatable resources are not mirrored.

Alternate Approach

Placing the origin server name in the reflected URL is generally a good strategy, but it may be considered undesirable for aesthetic or (in the case, e.g., of cookies) certain technical reasons.

It is possible to avoid the need for placing both the repeater name and the server name in the URL. Instead, a "family" of names may be created for a given origin server, each name identifying one of the repeaters used by that server.

For instance, if www.example.com is the origin server, names for three repeaters might be created:

wr1.example.com
wr2.example.com
wr3.example.com

The name "wr1.example.com" would be an alias for repeater 1, which might also be known by other names such as "wr1.anotherExample.com" and "wr1.example.edu".

If the repeater can determine by which name it was addressed, it can use this information (along with a table that associates repeater alias names with origin server names) to determine which origin server is being addressed. For instance, if repeater 1 is addressed as wr1.example.com, then the origin server is "www.example.com"; if it is addressed as "wr1.anotherExample.com", then the origin server is "www.anotherExample.com".

The repeater can use two mechanisms to determine by which alias it is addressed:

1. Each alias can be associated with a different IP address. Unfortunately, this solution does not scale well, as IP addresses are currently scarce, and the number of IP addresses required grows as the product of origin servers and repeaters.

2. The repeater can attempt to determine the alias name used by inspecting the "host:" tag in the HTTP header of the request. Unfortunately, some old browsers still in use do not attach the "host:" tag to a request. Reflectors would need to identify such browsers (the browser identity is a part of each request) and avoid this form of reflection.

How a Repeater Handles a Request

Figure 5:
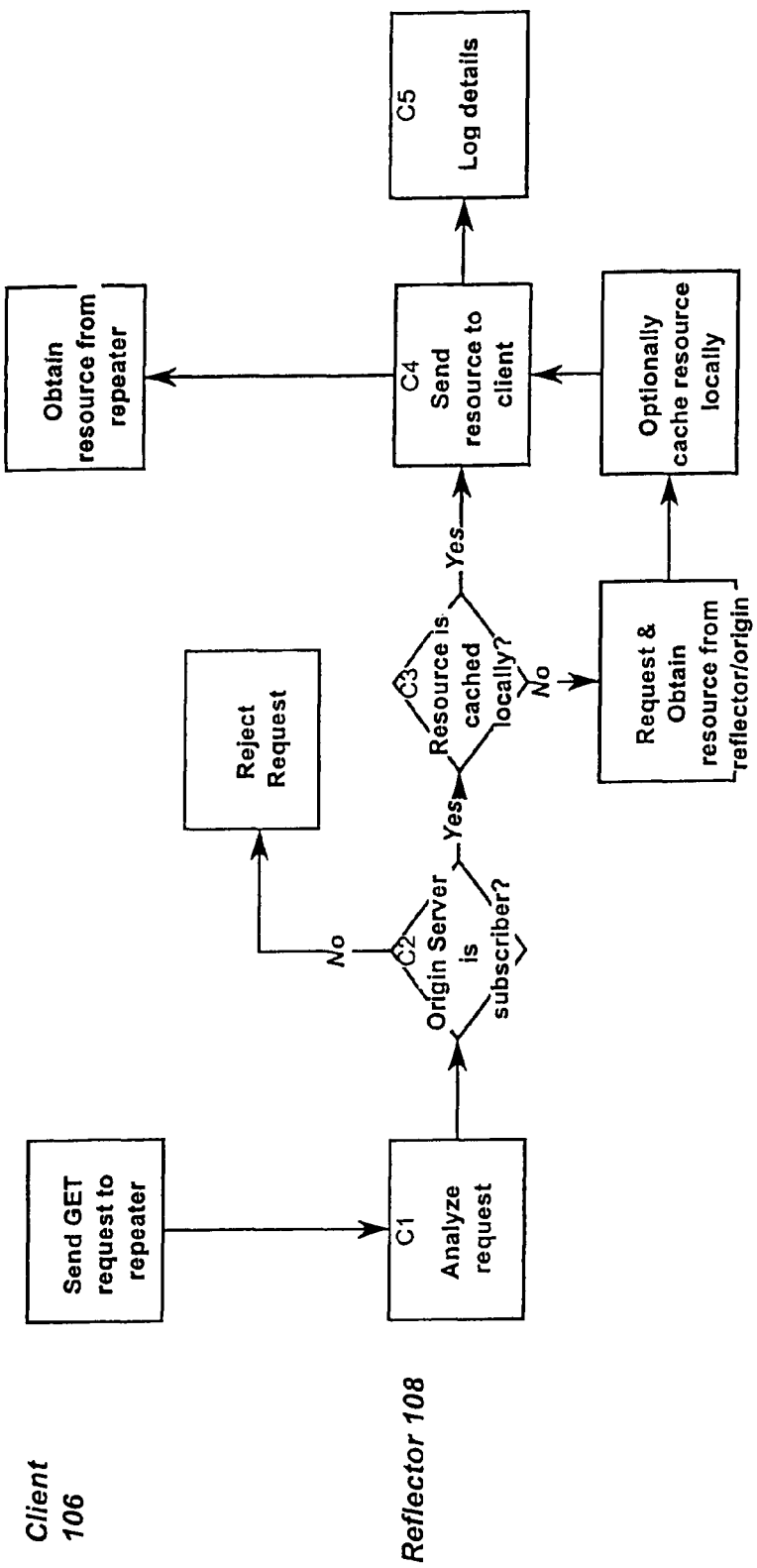

When a browser receives a REDIRECT response (as produced in B3), it reissues a request for the resource using the new resource identifier (URL) (A1-A5). Because the new identifier refers to a repeater instead of the origin server, the browser now sends a request for the resource to the repeater which processes a request as follows, with reference to FIG. 5:

C1. First the repeater analyzes the request to determine the network address of the requesting client and the path of the resource requested. Included in the path is an origin server name (as described above with reference to B3).

C2. The repeater uses an internal table to verify that the origin server belongs to a known "subscriber". A subscriber is an entity (e.g., a company) that publishes resources (e.g., files) via one or more origin servers. When the entity subscribes, it is permitted to utilize the repeater network. The subscriber tables described below include the information that is used to link reflectors to subscribers.

If the request is not for a resource from a known subscriber, the request is rejected. To reject a request, the repeater returns a reply indicating that the requested resource does not exist.

C3. The repeater then determines whether the requested resource is cached locally. If the requested resource is in the repeater's cache it is retrieved. On the other hand, if a valid copy of the requested resource is not in the repeater's cache, the repeater modifies the incoming URL, creating a request that it issues directly to the originating reflector which processes it (as in B1-B6). Because this request to the originating reflector is from a repeater, the reflector always returns the requested resource rather than reflecting the request. (Recall that reflectors always handle requests from repeaters locally.) If the repeater obtained the resource from the origin server, the repeater then caches the resource locally.

If a resource is not cached locally, the cache can query its "peer caches" to see if one of them contains the resource, before or at the same time as requesting the resource from the reflector/origin server. If a peer cache responds positively in a limited period of time (preferably a small fraction of a second), the resource will be retrieved from the peer cache.

C4. The repeater then constructs a reply including the requested resource (which was retrieved from the cache or from the origin server) and sends that reply to the requesting client.

C5. Details about the transaction, such as the associated reflector, the current time, the address of the requester, the URL requested, and the type of response generated, are written to a local log file at the repeater.

Figure 2:
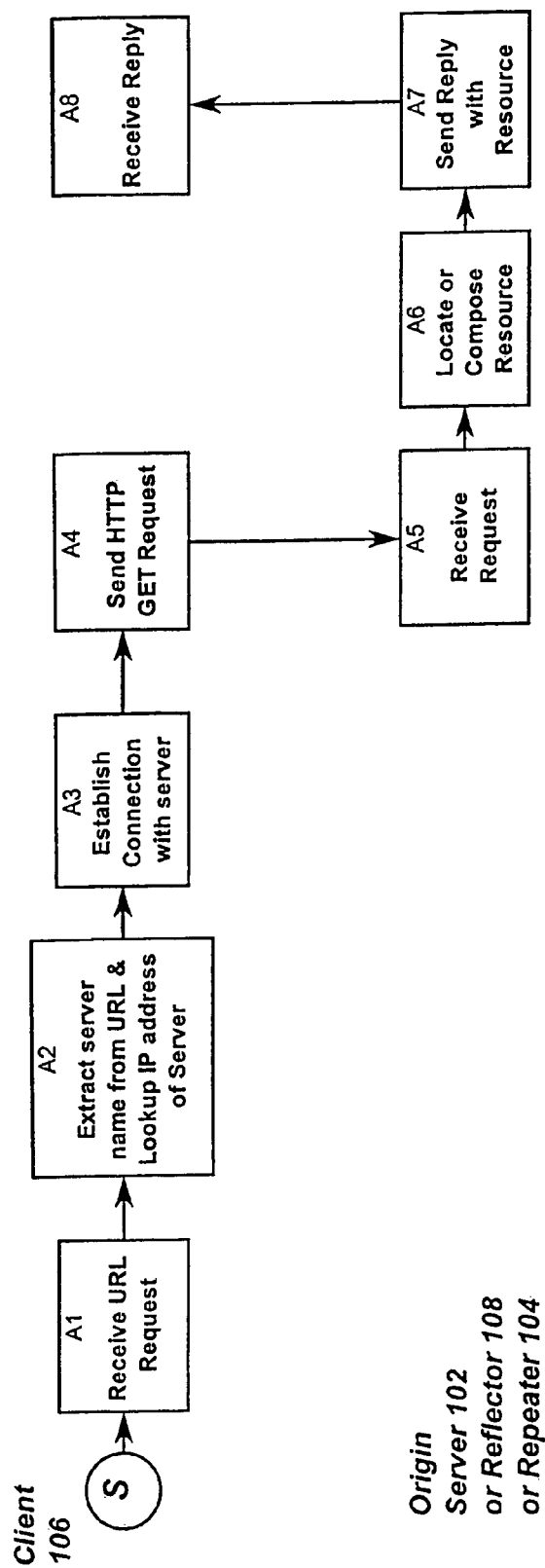
FIGS. 2-6 are flow charts of the operation of the present invention.

Note that the bottom row of FIG. 2 refers to an origin server, or a reflector, or a repeater, depending on what the URL in step A1 identifies.

Selecting the Best Repeater

If the reflector 108 determines that it will reflect the request, it must then select the best repeater to handle that request (as referred to in step B3-1). This selection is performed by the Best Repeater Selector (BRS) mechanism described here.

The goal of the BRS is to select, quickly and heuristically, an appropriate repeater for a given client given only the network address of the client. An appropriate repeater is one which is not too heavily loaded and which is not too far from the client in terms of some measure of network distance. The mechanism used here relies on specific, compact, pre-computed data to make a fast decision. Other, dynamic solutions can also be used to select an appropriate repeater.

The BRS relies on three pre-computed tables, namely the Group Reduction Table, the Link Cost Table, and the Load Table. These three tables (described below) are computed off-line and downloaded to each reflector by its contact in the repeater network.

The Group Reduction Table places every network address into a group, with the goal that addresses in a group share relative costs, so that they would have the same best repeater under varying conditions (i.e., the BRS is invariant over the members of the group).

The Link Cost Table is a two dimensional matrix which specifies the current cost between each repeater and each group. Initially, the link cost between a repeater and a group is defined as the "normalized link cost" between the repeater and the group, as defined below. Over time, the table will be updated with measurements which more accurately reflect the relative cost of transmitting a file between the repeater and a member of the group. The format of the Link Cost Table is <Group ID> <Group ID> <link cost>, where the Group ID's are given as AS numbers.

The Load Table is a one dimensional table which identifies the current load at each repeater. Because repeaters may have different capacities, the load is a value that represents the ability of a given repeater to accept additional work. Each repeater sends its current load to a central master repeater at regular intervals, preferably at least approximately once a minute. The master repeater broadcasts the Load Table to each reflector in the network, via the contact repeater.

A reflector is provided entries in the Load Table only for repeaters which it is assigned to use. The assignment of repeaters to reflectors is performed centrally by a repeater network operator at the master repeater. This assignment makes it possible to modify the service level of a given reflector. For instance, a very active reflector may use many repeaters, whereas a relatively inactive reflector may use few repeaters.

Tables may also be configured to provide selective repeater service to subscribers in other ways, e.g., for their clients in specific geographic regions, such as Europe or Asia.

Measuring Load

In the presently preferred embodiments, repeater load is measured in two dimensions, namely 1. requests received by the repeater per time interval (RRPT), and 2. bytes sent by the repeater pet time interval (BSPT).

For each of these dimensions, a maximum capacity setting is set. The maximum capacity indicates the point at which the repeater is considered to be fully loaded. A higher RRPT capacity generally indicates a faster processor, whereas a higher BSPT capacity generally indicates a wider network pipe. This form of load measurement assumes that a given server is dedicated to the task of repeating.

Each repeater regularly calculates its current RRPT and BSPT, by accumulating the number of requests received and bytes sent over a short time interval. These measurements are used to determine the repeater's load in each of these dimensions. If a repeater's load exceeds its configured capacity, an alarm message is sent to the repeater network administrator.

The two current load components are combined into a single value indicating overall current load. Similarly, the two maximum capacity components are combined into a single value indicating overall maximum capacity. The components ate combined as follows:

$$\text{current-load} = B \times \text{current RRPT} + (1-B) \times \text{current BSPT}$$

$$\text{max-load} = B \times \text{max RRPT} + (1-B) \times \text{max BSPT}$$

The factor B, a value between 0 and 1, allows the relative weights of RRPT and BSPT to be adjusted, which favors consideration of either processing power or bandwidth.

The overall current load and overall maximum capacity values are periodically sent from each repeater to the master repeater, where they are aggregated in the Load Table, a table summarizing the overall load for all repeaters. Changes in the Load Table are distributed automatically to each reflector.

While the preferred embodiment uses a two-dimensional measure of repeater load, any other measure of load can be used.

Combining Link Costs and Load

The BRS computes the cost of servicing a given client from each eligible repeater. The cost is computed by combining the available capacity of the candidate repeater with the cost of the link between that repeater and the client. The link cost is computed by simply looking it up in the Link Cost table.

The cost is determined using the following formula:

$$\text{threshold} = K * \text{max-load}$$

$$\text{capacity} = \max(\text{max-load} - \text{current-load}, e)$$

$$\text{capacity} = \min(\text{capacity}, \text{threshold})$$

$$\text{cost} = \text{link-cost} * \text{threshold}/\text{capacity}$$

In this formula, e is a very small number (epsilon) and K is a tuning factor initial set to 0.5. This formula causes the cost to a given repeater to be increased, at a rate defined by K, if its capacity falls below a configurable threshold.

Given the cost of each candidate repeater, the BRS selects all repeaters within a delta factor of the best score. From this set, the result is selected at random.

The delta factor prevents the BRS from repeatedly selecting a single repeater when scores are similar. It is generally required because available information about load and link costs loses accuracy over time. This factor is tunable.

Best Repeater Selector (BRS)

Figure 6:
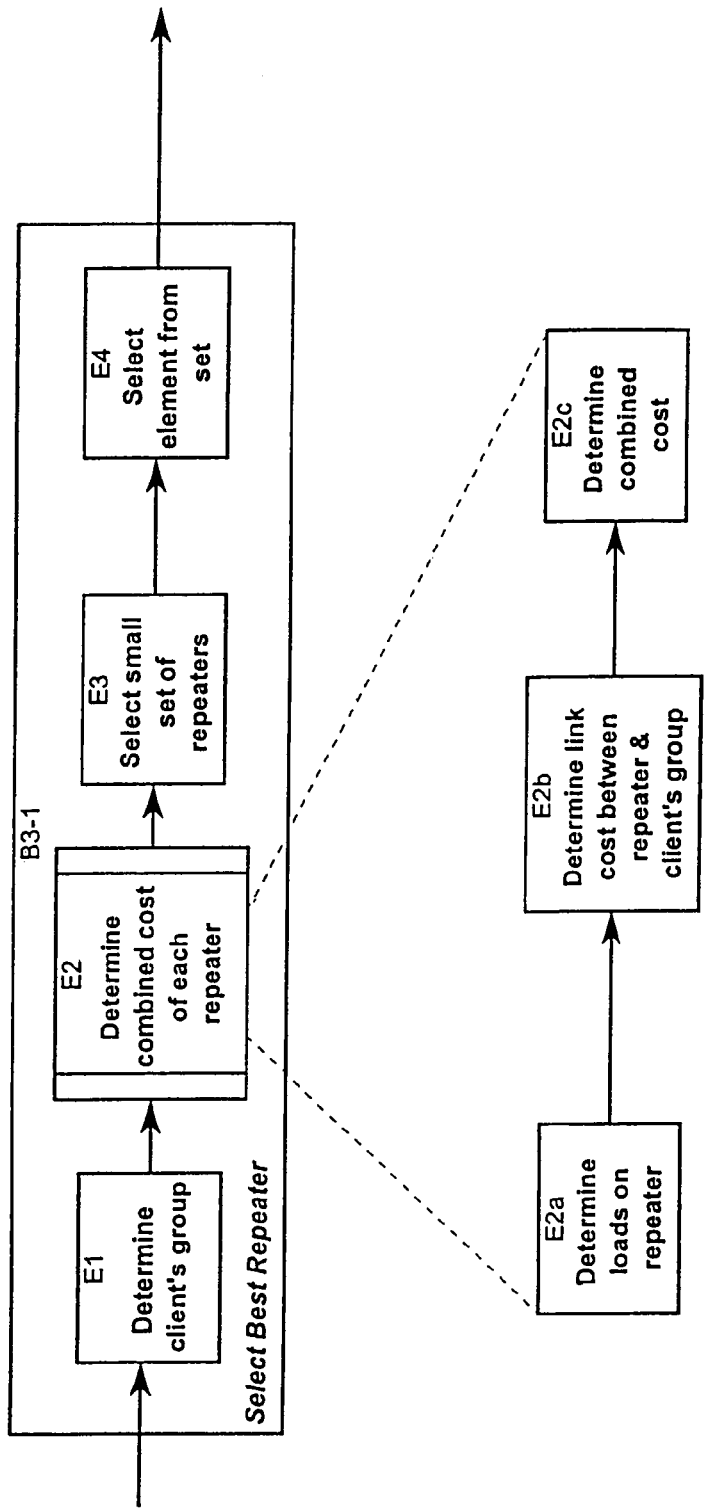

The BRS operates as follows, with reference to FIG. 6:

Given a client network address and the three tables described above:

E1. Determine which group the client is in using the Group Reduction Table.

E2. For each repeater in the Link Cost Table and Load Table, determine that repeater's combined cost as follows:

E2a. Determine the maximum and current load on the repeater (using the Load Table).

E2b. Determine the link cost between the repeater and the client's group (using the Link Cost Table).

E2c. Determine the combined cost as described above.

E3. Select a small set of repeaters with the lowest cost.

E4. Select a random member from the set.

Preferably the results of the BRS processing are maintained in a local cache at the reflector 108. Thus, if the best repeater has recently been determined for a given client (i.e., for a given network address), that best repeater can be reused quickly without being re-determined. Since the calculation described above is based on statically, pre-computed tables, if the tables have not changed then there is no need to re-determine the best repeater.

Determining the Group Reduction and Link Cost Tables

The Group Reduction Table and Link Cost Table used in BRS processing are created and regularly updated by an independent procedure referred to herein as NetMap. The NetMap procedure is run by executing several phases (described below) as needed.

The term Group is used here to refers to an IP "address group".

The term Repeater Group refers to a Group that contains the IP address of a repeater.

The term link cost refers to a statically determined cost for transmitting data between two Groups. In a presently preferred implementation, this is the minimum of the sums of the costs of the links along each path between them. The link costs of primary concern here are link costs between a Group and a Repeater Group.

The term relative link cost refers to the link cost relative to other link costs for the same Group which is calculated by subtracting the minimum link cost from a Group to any Repeater Group from each of its link costs to a Repeater Group. The term Cost Set refers to a set of Groups that are equivalent in regard to Best Repeater Selection. That is, given the information available, the same repeater would be selected for any of them.

The NetMap procedure first processes input files to create an internal database called the Group Registry. These input files describe groups, the IP addresses within groups, and links between groups, and come a variety of sources, including publicly available Internet Routing Registry (IRR) databases, BGP router tables, and probe services that are located at various points around the Internet and use publicly available tools (such as "traceroute") to sample data paths. Once this processing is complete, the Group Registry contains essential information used for further processing, namely (1) the identity of each group, (2) the set of IP addresses in a given group, (3) the presence of links between groups indicating paths over which information may travel, and (4) the cost of sending data over a given link.

The following processes are then performed on the Group Registry file.

Calculate Repeater Group Link Costs

The NetMap procedure calculates a "link cost" for transmission of data between each Repeater Group and each Group in the Group Registry. This overall link cost is defined as the minimum cost of any path between the two groups, where the cost of a path is equal to the sum of the costs of the individual links in the path. The link cost algorithm presented below is essentially the same as algorithm #562 from ACM journal Transactions on Mathematical Software: "Shortest Path From a Specific Node to All Other Nodes in a Network" by U. Pape, ACM TOMS 6 (1980) pp. 450-455, http://www.netlib.org/toms/562.

In this processing, the term Repeater Group refers to a Group that contains the IP address of a repeater. A group is a neighbor of another group if the Group Registry indicates that there is a link between the two groups.

For each target Repeater Group T:
  Initialize the link cost between T and itself to zero.
  Initialize the link cost between T and every other Group to infinity.
  Create a list L that will contain Groups that are equidistant from the target Repeater Group T.
  Initialize the list L to contain just the target Repeater Group T itself.
  While the list L is not empty:
    Create an empty list L' of neighbors of members of the list L.
    For each Group G in the list L:
      For each Group N that is a neighbor of G:
        Let cost refer to the sum of the link cost between T and G, and the link cost between G and N.
        The cost between T and G was determined in the previous pass of the algorithm; the link cost between G and N is from the Group Registry.
        If cost is less than the link cost between T and N:
          Set the link cost between T and N to cost.
          Add N to L' if it is not already on it.
    Set L to L'.

Calculate Cost Sets

A Cost Set is a set of Groups that are equivalent with respect to Best Repeater Selection. That is, given the information available, the same repeater would be selected for any of them.

The "cost profile" of a Group G is defined herein as the set of costs between G and each Repeater. Two cost profiles are said to be equivalent if the values in one profile differ from the corresponding values in the other profile by a constant amount.

Once a client Group is known, the Best Repeater Selection algorithm relies on the cost profile for information about the Group. If two cost profiles are equivalent, the BRS algorithm would select the same repeater given either profile.

A Cost Set is then a set of groups that have equivalent cost profiles.

The effectiveness of this method can be seen, for example, in the case where all paths to a Repeater from some Group A pass through some other Group B. The two Groups have equivalent cost profiles (and are therefore in the same Cost Set) since whatever Repeater is best for Group A is also going to be best for Group B, regardless of what path is taken between the two Groups.

By normalizing cost profiles, equivalent cost profiles can be made identical. A normalized cost profile is a cost profile in which the minimum cost has the value zero. A normalized cost profile is computed by finding the minimum cost in the profile, and subtracting that value from each cost in the profile.

Cost Sets are then computed using the following algorithm:

For each Group G:
    Calculate the normalized cost profile for G
    Look for a Cost Set with the same normalized cost profile.
    If such as set is found, add G to the existing Cost Set;
    otherwise, create a new Cost Set with the calculated normalized cost profile, containing only G.

The algorithm for finding Cost Sets employs a hash table to reduce the time necessary to determine whether the desired Cost Set already exists. The hash table uses a hash value computed from cost profile of G.

Each Cost Set is then numbered with a unique Cost Sent Index number. Cost Sets are then used in a straightforward manner to generate the Link Cost Table, which gives the cost from each Cost Set to each Repeater.

As described below, the Group Reduction Table maps every IP address to one of these Cost Sets.

Build IP Map

The IP Map is a sorted list of records which map IP address ranges to Link Cost Table keys. The format of the IP map is:
    <base IP address> <max IP address> <Link Cost Table key>
where IP addresses are presently represented by 32-bit integers. The entries are sorted by descending base address, and by ascending maximum address among equal base addresses, and by ascending Link Cost Table key among equal base addresses and maximum addresses. Note that ranges may overlap.

The NetMap procedure generates an intermediate IP map containing a map between IP address ranges and Cost Set numbers as follows:
for each Cost Set S:
    For each Group G in S:
        For each IP address range in G:
            Add a triple flow address, high address, Cost Set number of S) to the IP map.

The IP map file is then sorted by descending base address, and by ascending maximum address among equal base addresses, and by ascending Cost Set number among equal base addresses and maximum addresses. The sort order for the base address and maximum address minimizes the time to build the Group Reduction Table and produces the proper results for overlapping entries.

Finally, the NetMap procedure creates the Group Reduction Table by processing the sorted IP map. The Group Reduction Table maps IP addresses (specified by ranges) into Cost Set numbers. Special processing of the IP map file is required in order to detect overlapping address ranges, and to merge adjacent address ranges in order to minimize the size of the Group Reduction Table.

An ordered list of address range segments is maintained, each segment consisting of a base address B and a Cost Set number N, sorted by base address B. (The maximum address of a segment is the base address of the next segment minus one.)

The following algorithm is used:
Initialize the list with the elements [−infinity, NOGROUP], [+infinity, NOGROUP].
    For each entry in the IP map, in sorted order, consisting of (b, m, s),
        Insert (b, m, s) in the list (recall that IP map entries are of the form Vow address, high address Cost Set number of S))
    For each reserved LAN address range (b, m):
        Insert (b, m, LOCAL) in the list.
    For each Repeater at address a:
        Insert (a, a, REPEATER) in the list.
    For each segment S in the ordered list:
        Merge S with following segments with the same Cost Set
        Create a Group Reduction Table entry with base address from the base address of S,
            max address=next segment's base−1,
            group ID=Cost Set number of S.

A reserved LAN address range is an address range reserved for use by LANs which should not appear as a global Internet address. LOCAL is a special Cost Set index different from all others, indicating that the range maps to a client which should never be reflected. REPEATER is a special Cost Set index different from all others, indicating that the address range maps to a repeater. NOGROUP is a special Cost Set index different from all others, indicating that this range of addresses has no known mapping.

Given (B, M, N), insert an entry in the ordered address list as follows:
Find the last segment (AB, AN) for which AB is less than or equal to B.
If AB is less than B, insert a new segment (B, N) after (AB, AN).
Find the last segment (YB, YN) for which YB is less than or equal to M.
Replace by (XB, N) any segment (XB, NOGROUP) for which XB is greater than B and less than YB.
If YN is not N, and either YN is NOGROUP or YB is less than or equal to B,
    Let (ZB, ZN) be the segment following (YB, YN).
    If M+1 is less than ZB, insert a new segment (M+1, YN) before (ZB, ZN).
    Replace (YB, YN) by (YB, N).

Rewriting HTML Resources

As explained above with reference to FIG. 3 (B5), when a reflector or repeater serves a resource which itself includes resource identifiers (e.g., a HTML resource), that resource is modified (rewritten) to pre-reflect resource identifiers (URLs) of repeatable resources that appear in the resource. Rewriting ensures that when a browser requests repeatable resources identified by the requested resource, it gets them from a repeater without going back to the origin server, but when it requests non-repeatable resources identified by the requested resource, it will go directly to the origin server. Without this optimization, the browser would either make all requests at the origin server (increasing traffic at the origin server and necessitating far more redirections from the origin server), or it would make all requests at the repeater (causing the repeater to redundantly request and copy resources which could not be cached, increasing the overhead of serving such resources).

Rewriting requires that a repeater has been selected (as described above with reference to the Best Repeater Selector). Rewriting uses a so-called BASE directive. The BASE directive lets the HTML identify a different base server. (The base address is normally the address of the HTML resource.)

Rewriting is performed as follows:
F1. A BASE directive is added at the beginning of the HTML resource, or modified where necessary. Normally, a browser interprets relative URLs as being relative to the default base address, namely, the URL of the HTML resource (page) in which they are encountered. The BASE address added specifies the resource at the reflector which originally served the resource. This means that unprocessed relative URLs (such as those generated by Javascript™ programs) will be interpreted as relative to the reflector. Without this BASE address, browsers would combine relative addresses with repeater names to create URLs which were not in the form required by repeaters (as described above in step D1).

F2. The rewriter identifies directives, such as embedded images and anchors, containing URLs. If the rewriter is running in a reflector, it must parse the HTML file to identify these directives.

If it is running in a repeater, the rewriter may have access to pre-computed information that identifies the location of each URL (placed in the HTML file in step F4).

F3. For each URL encountered in the resource to be rewritten, the rewriter must determine whether the URL is repeatable (as in steps B1-B2). If the URL is not repeatable, it is not modified. On the other hand, if the URL is repeatable, it is modified to refer to the selected repeater.

F4. After all URLs have been identified and modified, if the resource is being served to a repeater, a table is appended at the beginning of the resource that identifies the location and content of each URL encountered in the resource. (Ms step is an optimization which eliminates the need for parsing HTML resources at the repeater.)

F5. Once all changes have been identified, a new length is computed for the resource (page). The length is inserted in the HTTP header prior to serving the resource.

An extension of HTML, known as XML, is currently being developed. The process of rewriting URLs will be similar for XML, with some differences in the mechanism that parses the resource and identifies embedded URLs.

Handling Non-HTTP Protocols

This invention makes it possible to reflect references to resources that are served by protocols other than HTTP, for instance, the File Transfer Protocol (FTP) and audio/video stream protocols. However, many protocols do not provide the ability to redirect requests. It is, however, possible to redirect references before requests are actually made by rewriting URLs embedded in HTML pages. The following modifications to the above algorithms are used to support this capability.

In F4, the rewriter rewrites URLs for servers if those servers appear in a configurable table of cooperating origin server or so-called co-servers. The reflector operator can define this table to include FTP servers and other servers. A rewritten URL that refers to a non-HTTP resource takes the form:

http://<repeater>/<origin sender>@proxy=<scheme>[:<type>]@/resource where <scheme> is a supported protocol name such as "ftp". This URL format is an alternative to the form shown in B3.

In C3, the repeater looks for a protocol embedded in the arriving request. If a protocol is present and the requested resource is not already cached, the repeater uses the selected protocol instead of the default H=T) protocol to request the resource when serving it and storing it in the cache.

System Configuration and Management

In addition to the processing described above, the repeater network requires various mechanisms for system configuration and network management. Some of these mechanisms are described here.

Reflectors allow their operators to synchronize repeater caches by performing publishing operations. The process of keeping repeater caches synchronized is described below. Publishing indicates that a resource or collection of resources has changed.

Repeaters and reflectors participate in various types of log processing. The results of logs collected at repeaters are collected and merged with logs collected at reflectors, as described below.

Adding Subscribers to the Repeater Network

When a new subscriber is added to the network, information about the subscriber is entered in a Subscriber Table at the master repeater and propagated to all repeaters in the network. This information includes the Committed Aggregate Information Rate (CAIR) for servers belonging to the subscriber, and a list of the repeaters that may be used by servers belonging to the subscriber.

Adding Reflectors to the Repeater Network

When a new reflector is added to the network, it simply connects to and announces itself to a contact repeater, preferably using a securely encrypted certificate including the repeater's subscriber identifier.

The contact repeater determines whether the reflector network address is permitted for this subscriber. If it is, the contact repeater accepts the connection and updates the reflector with all necessary tables (using version numbers to determine which tables are out of date).

The reflector processes requests during this time, but is not "enabled" (allowed to reflect requests) until all of its tables are current.

Keeping Repeater Caches Synchronized

Repeater caches are coherent, in the sense that when a change to a resource is identified by a reflector, all repeater caches are notified, and accept the change in a single transaction.

Only the identifier of the changed resource (and not the entire resource) is transmitted to the repeaters; the identifier is used to effectively invalidate the corresponding cached resource at the repeater. This process is far more efficient than broadcasting the content of the changed resource to each repeater.

A repeater will load the newly modified resource the next time it is requested.

A resource change is identified at the reflector either manually by the operator, or through a script when files are installed on the server, or automatically through a change detection mechanism (e.g., a separate process that checks regularly for changes).

A resource change causes the reflector to send an "invalidate" message to its contact repeater, which forwards the message to the master repeater. The invalidate message contains a list of resource identifiers (or regular expressions identifying patterns of resource identifiers) that have changed. (Regular expressions are used to invalidate a directory or an entire server.) The repeater network uses a two-phase commit process to ensure that all repeaters correctly invalidate a given resource.

The invalidation process operates as follows:

The master broadcasts a "phase 1" invalidation request to all repeaters indicating the resources and regular expressions describing sets of resources to be invalidated.

When each repeater receives the phase 1 message, it first places the resource identifiers or regular expressions into a list of resource identifiers pending invalidation.

Any resource requested (in C3) that is in the pending invalidation list may not be served from the cache. This prevents the cache from requesting the resource from a peer cache which may not have received an invalidation notice. Were it to request a resource in this manner, it might replace the newly invalidated resource by the same, now stale, data.

The repeater then compares the resource identifier of each resource in its cache against the resource identifiers and regular expressions in the list.

Each match is invalidated by marking it stale and optionally removing it from the cache. This means that a future request for the resource will cause it to retrieve a new copy of the resource from the reflector.

When the repeater has completed the invalidation, it returns an acknowledgment to the master. The master waits until all repeaters have acknowledged the invalidation request.

If a repeater fails to acknowledge within a given period, it is disconnected from the master repeater. When it reconnects, it will be told to flush its entire cache, which will eliminate any consistency problem. (To avoid flushing the entire cache, the master could keep a log of all invalidations performed, sorted by date, and flush only files invalidated since the last time the reconnecting repeater successfully completed an invalidation. In the presently preferred embodiments this is not done since it is believed that repeaters will seldom disconnect.)

When all repeaters have acknowledged invalidation (or timed out) the repeater broadcasts a "phase 2" invalidation request to all repeaters. This causes the repeaters to remove the corresponding resource identifiers and regular expressions from the list of resource identifiers pending invalidation.

In another embodiment, the invalidation request will be extended to allow a "server push". In such requests, after phase 2 of the invalidation process has completed, the repeater receiving the invalidation request will immediately request a new copy of the invalidated resource to place in its cache.

Logs and Log Processing

Web server activity logs are fundamental to monitoring the activity in a Web site. This invention creates "merged logs" that combine the activity at reflectors with the activity at repeaters, so that a single activity log appears at the origin server showing all Web resource requests made on behalf of that site at any repeater.

This merged log can be processed by standard processing tools, as if it had been generated locally.

On a periodic basis, the master repeater (or its delegate) collects logs from each repeater. The logs collected are merged, sorted by reflector identifier and timestamp, and stored in a dated file on a per-reflector basis. The merged log for a given reflector represents the activity of all repeaters on behalf of that reflector. On a periodic basis, as configured by the reflector operator, a reflector contacts the master repeater to request its merged logs. It downloads these and merges them with its locally maintained logs, sorting by timestamp. The result is a merged log that represents all activity on behalf of repeaters and the given reflector.

Activity logs are optionally extended with information important to the repeater network, if the reflector is configured to do so by the reflector operator. In particular, an "extended status code" indicates information about each request, such as:

1. request was served by a reflector locally;
2. request was reflected to a repeater;*
3. request was served by a reflector to a repeater;*
4. request for non-repeatable resource was served by repeater;*
5. request was served by a repeater from the cache;
6. request was served by a repeater after filling cache;
7. request pending invalidation was served by a repeater.

(The activities marked with "*" represent intermediate states of a request and do not normally appear in a final activity log.)

In addition, activity logs contain a duration, and extended precision timestamps. The duration makes it possible to analyze the time required to serve a resource, the bandwidth used, the number of requests handled in parallel at a given time, and other quite useful information. The extended precision timestamp makes it possible to accurately merge activity logs.

Repeaters use the Network Time Protocol (NTP) to maintain synchronized clocks. Reflectors may either use NTP or calculate a time bias to provide roughly accurate timestamps relative to their contact repeater.

Enforcing Committed Aggregate Information Rate

The repeater network monitors and limits the aggregate rate at which data is served on behalf of a given subscriber by all repeaters. This mechanism provides the following benefits:

1. provides a means of pricing repeater service;
2. provides a means for estimating and reserving capacity at repeaters;
3. provides a means for preventing clients of a busy site from limiting access to other sites.

For each subscriber, a "threshold aggregate information rate" (TAIR) is configured and maintained at the master repeater. This threshold is not necessarily the committed rate, it may be a multiple of committed rate, based on a pricing policy.

Each repeater measures the information rate component of each reflector for which it serves resources, periodically (typically about once a minute), by recording the number of bytes transmitted on behalf of that reflector each time a request is delivered. The table thus created is sent to the master repeater once per period. The master repeater combines the tables from each repeater, summing the measured information of each reflector over all repeaters that serve resources for that reflector, to determine the "measured aggregate information rate" SIR) for each reflector.

If the MAIR for a given reflector is greater than the TAIR for that reflector, the MAIR is transmitted by the master to all repeaters and to the respective reflector.

When a reflector receives a request, it determines whether its most recently calculated MAIR is greater than its TAIR. If this is the case, the reflector probabilistically decides whether to suppress reflection, by serving the request locally (in B2). The probability of suppressing the reflection increases as an exponential function of the difference between the MAIR and the CAIR.

Serving a request locally during a peak period may strain the local origin server, but it prevents this subscriber from taking more than allocated bandwidth from the shared repeater network.

When a repeater receives a request for a given subscriber (in C2), it determines whether the subscriber is running near its threshold aggregate information rate. If this is the case, it probabilistically decides whether to reduce its load by redirecting the request back to the reflector. The probability increases exponentially as the reflector's aggregate information rate approaches its limit.

If a request is reflected back to a reflector, a special character string is attached to the resource identifier so that the receiving reflector will not attempt to reflect it again. In the current system, this string has the form "src=overload".

The reflector tests for this string in B2.

The mechanism for limiting Aggregate Information Rate described above is fairly coarse. It limits at the level of sessions with clients (since once a client has been reflected to a given repeater, the rewriting process tends to keep the client coming back to that repeater) and, at best, individual requests for resources. A more fine-grained mechanism for enforcing TAIR limits within repeaters operates by reducing the bandwidth consumption of a busy subscriber when other subscribers are competing for bandwidth.

The fine-grained mechanism is a form of data "rate shaping". It extends the mechanism that copies resource data to a connection when a reply is being sent to a client. When an output channel is established at the time a request is received, the repeater identifies which subscriber the channel is operating for, in C2, and records the subscriber in a data field associated with the channel. Each time a "write" operation is about to be made to the channel, the Metered Output Stream first inspects the current values of the MAIR and TAIR, calculated above, for the given subscriber. If the MAIR is larger than the TAIR, then the mechanism pauses briefly before performing the write operation. The length of the pause is proportional to the amount the MAIR exceeds the TAIR. The pause ensures that tasks sending other resources to other clients, perhaps on behalf of other subscribers, will have an opportunity to send their data.

Repeater Network Resilience

The repeater network is capable of recovering when a repeater or network connection fails.

A repeater cannot operate unless it is connected to the master repeater. The master repeater exchanges critical information with other repeaters, including information about repeater load, aggregate information rate, subscribers, and link cost.

If a master fails, a "succession" process ensures that another repeater will take over the role of master, and the network as a whole will remain operational. If a master fails, or a connection to a master fails through a network problem, any repeater attempting to communicate with the master will detect the failure, either through an indication from TCP/IP, or by timing out from a regular "heartbeat" message it sends to the master.

When any repeater is disconnected from its master, it immediately tries to reconnect to a series of potential masters based on a configurable file called its "succession list".

The repeater tries each system on the list in succession until it successfully connects to a master. If in this process, it comes to its own name, it takes on the role of master, and accepts connections from other repeaters. If a repeater which is not at the top of the list becomes the master, it is called the "temporary master".

A network partition may cause two groups of repeaters each to elect a master. When the partition is corrected, it is necessary that the more senior master take over the network. Therefore, when a repeater is temporary master, it regularly tries to reconnect to any master above it in the succession list. If it succeeds, it immediately disconnects from all of the repeaters connected to it. When they retry their succession lists, they will connect to the more senior master repeater.

To prevent losses of data, a temporary master does not accept configuration changes and does not process log files. In order to take on these tasks, it must be informed that it is primary master by manual modification of its successor list. Each repeater regularly reloads its successor list to determine whether it should change its idea of who the master is.

If a repeater is disconnected from the master, it must resynchronize its cache when it reconnects to the master. The master can maintain a list of recent cache invalidations and send to the repeater any invalidations it was not able to process while disconnected. If this list is not available for some reason (for instance, because the reflector has been disconnected too long), the reflector must invalidate its entire cache.

A reflector is not permitted to reflect requests unless it is connected to a repeater. The reflector relies on its contact repeater for critical information, such as load and Link Cost Tables, and current aggregate information rate. A reflector that is not connected to a repeater can continue to receive requests and handle them locally.

If a reflector loses its connection with a repeater, due to a repeater failure or network outage, it continues to operate while it tries to connect to a repeater.

Each time a reflector attempts to connect to a repeater, it uses DNS to identify a set of candidate repeaters given a domain name that represents the repeater network. The reflector tries each repeater in this set until it makes a successful contact. Until a successful contact is made, the reflector serves all requests locally. When a reflector connects to a repeater, the repeater can tell it to attempt to contact a different repeater; this allows the repeater network to ensure that no individual repeater has too many contacts.

When contact is made, the reflector provides the version number of each of its tables to its contact repeater. The repeater then decides which tables should be updated and sends appropriate updates to the reflector. Once all tables have been updated, the repeater notifies the reflector that it may now start reflecting requests.

Using a Proxy Cache within a Repeater

Repeaters are intentionally designed so that any proxy cache can be used as a component within them. This is possible because the repeater receives HTTP requests and converts them to a form recognized by the proxy cache.

On the other hand, several modifications to a standard proxy cache have been or may be made as optimizations. This includes, in particular, the ability to conveniently invalidate a resource, the ability to support cache quotas, and the ability to avoid making an extra copy of each resource as it passes from the proxy cache through the repeater to the requester.

In a preferred embodiment, a proxy cache is used to implement C3. The proxy cache is dedicated for use only by one or more repeaters. Each repeater requiring a resource from the proxy cache constructs a proxy request from the inbound resource request. A normal HTTP GET request to a server contains only the pathname part of the URL—the scheme and server name are implicit. (In an HTTP GET request to a repeater, the pathname part of the URL includes the name of the origin server on behalf of which the request is being made, as described above.) However, a proxy agent GET request takes an entire URL. Therefore, the repeater must construct a proxy request containing the entire URL from the path portion of the URL it receives. Specifically, if the incoming request takes the form:

GET/<origin server>/<path> then the repeater constructs a proxy request of the form:

GET http:/<origin server>/<path> and if the incoming request takes the form:

GET <origin server>@proxy=<scheme>:<type>@/<path> then the repeater constructs a proxy request of the form:

GET <scheme>://<origin server>/<path>

Cache Control

HTTP replies contain directives called cache control directives, which are used to indicate to a cache whether the attached resource may be cached and if so, when it should expire. A Web site administrator configures the Web site to attach appropriate directives. Often, the administrator will not know how long a page will be fresh, and must define a short expiration time to try to prevent caches from serving stale data. In many cases, a Web site operator will indicate a short expiration time only in order to receive the requests (or hits) that would otherwise be masked by the presence of a cache. This is known in the industry as "cache-busting". Although some cache operators may consider cache-busting to be impolite, advertisers who rely on this information may consider it imperative.

When a resource is stored in a repeater, its cache directives can be ignored by the repeater, because the repeater receives explicit invalidation events to determine when a resource is stale. When a proxy cache is used as the cache at the repeater, the associated cache directives may be temporarily disabled. However, they must be re-enabled when the resource is served from the cache to a client, in order to permit the cache-control policy (including any cache-busting) to take effect.

The present invention contains mechanisms to prevent the proxy cache within a repeater from honoring cache control directives, while permitting the directives to be served from the repeater.

When a reflector serves a resource to a repeater in B4, it replaces all cache directives by modified directives that are ignored by the repeater proxy cache. It does this by prefixing a distinctive string such as "wr-" to the beginning of the HTTP tag. Thus, "expires" becomes "wr-expires", and "cache-control" becomes "wr-cache-control". This prevents the proxy cache itself from honoring the directives. When a repeater serves a resource in C4, and the requesting client is not another repeater, it searches for HTTP tags beginning with "wr-" and removes the "wr-". This allows the clients retrieving the resource to honor the directives.

Resource Revalidation

There are several cases where a resource may be cached so long as the origin server is consulted each time it is served. In one case, the request for the resource is attached to a so-called "cookie". The origin server must be presented with the cookie to record the request and determine whether the cached resource may be served or not. In another case, the request for the resource is attached to an authentication header (which identifies the requester with a user id and password). Each new request for the resource must be tested at the origin server to assure that the requester is authorized to access the resource.

The HTTP 1.1 specification defines a reply header titled "Must-Revalidate" which allows an origin server to instruct a proxy cache to "revalidate" a resource each time a request is received. Normally, this mechanism is used to determine whether a resource is still fresh. In the present invention, Must-Revalidate makes it possible to ask an origin server to validate a request that is otherwise served from a repeater.

The reflector rule base contains information that determines which resources may be repeated but must be revalidated each time they are served. For each such resource, in B4, the reflector attaches a Must-Revalidate header. Each time a request comes to a repeater for a cached resource marked with a Must-Revalidate header, the request is forwarded to the reflector for validation prior to serving the requested resource.

Cache Quotas

The cache component of a repeater is shared among those subscribers that reflect clients to that repeater. In order to allow subscribers fair access to storage facilities, the cache may be extended to support quotas.

Normally, a proxy cache may be configured with a disk space threshold T. Whenever more than T bytes are stored in the cache, the cache attempts to find resources to eliminate.

Typically a cache uses the least-recently-used (LRU) algorithm to determine which resources to eliminate; more sophisticated caches use other algorithms. A cache may also support several threshold values—for instance, a lower threshold which, when reached, causes a low priority background process to remove items from the cache, and a higher threshold which, when reached, prevents resources from being cached until sufficient free disk space has been reclaimed.

If two subscribers A and B share a cache, and more resources of subscriber A are accessed during a period of time than resources of subscriber B, then fewer of B's resources will be in the cache when new requests arrive. It is possible that, due to the behavior of A, B's resources will never be cached when they are requested. In the present invention, this behavior is undesirable. To address this issue, the invention extends the cache at a repeater to support cache quotas.

The cache records the amount of space used by each subscriber in $D_S$, and supports a configurable threshold $T_S$ for each subscriber.

Whenever a resource is added to the cache (at C3), the value $D_S$ is updated for the subscriber providing the resource. If $D_S$ is larger than $T_S$, the cache attempts to find resources to eliminate, from among those resources associated with subscriber S. The cache is effectively partitioned into separate areas for each subscriber.

The original threshold T is still supported. If the sum of reserved segments for each subscriber is smaller than the total space reserved in the cache, the remaining area is "common" and subject to competition among subscribers.

Note, this mechanism might be implemented by modifying the existing proxy cache discussed above, or it might also be implemented without modifying the proxy cache—if the proxy cache at least makes it possible for an external program to obtain a list of resources in the cache, and to remove a given resource from the cache.

Rewriting from Repeaters

When a repeater receives a request for a resource, its proxy cache may be configured to determine whether a peer cache contains the requested resource. If so, the proxy cache obtains the resource from the peer cache, which can be faster than obtaining it from the origin server (the reflector). However, a consequence of this is that rewritten HTML resources retrieved from the peer cache would identify the wrong repeater. Thus, to allow for cooperating proxy caches, resources are preferably rewritten at the repeater.

When a resource is rewritten for a repeater, a special tag is placed at the beginning of the resource. When constructing a reply, the repeater inspects the tag to determine whether the resource indicates that additional rewriting is necessary. If so, the repeater modifies the resource by replacing references to the old repeater with references to the new repeater.

It is only necessary to perform this rewriting when a resource is served to the proxy cache at another repeater.

Repeater-Side Include

Sometimes, an origin server constructs a custom resource for each request (for instance, when inserting an advertisement based on the history of the requesting client). In such a case, that resource must be served locally rather than repeated. Generally, a custom resource contains, along with the custom information, text and references to other, repeatable, resources.

The process that assembles a "page" from a text resource and possibly one or more image resources is performed by the Web browser, directed by HTML. However, it is not possible using HTML to cause a browser to assemble a page using text or directives from a separate resource. Therefore, custom resources often necessarily contain large amounts of static text that would otherwise be repeatable.

To resolve this potential inefficiency, repeaters recognize a special directive called a "repeater side include". This directive makes it possible for the repeater to assemble a custom resource, using a combination of repeatable and local resources. In this way, the static text can be made repeatable, and only the special directive need be served locally by the reflector.

For example, a resource X might consist of custom directives selecting an advertising banner, followed by a large text article. To make this resource repeatable, the Web site administrator must break out a second resource, Y, to select the banner. Resource X is modified to contain a repeater-side include directive identifying resource Y, along with the article. Resource Y is created and contains only the custom directives selecting an ad banner. Now resource X is repeatable, and only resource Y, which is relatively small, is not repeatable.

When a repeater constructs a reply, it determines whether the resource being served is an HTML resource, and if so, scans it for repeater-side include directives. Each such directive includes a URL, which the repeater resolves and substitutes in place of the directive. The entire resource must be assembled before it is served, in order to determine its final size, as the size is included in a reply header ahead of the resource.

Thus, a method and apparatus for dynamically replicating selected resources in computer networks is provided. One skilled in the art will appreciate that the present invention can be practiced by other than the described embodiments, which are presented for purposes of illustration and not limitation, and the present invention is limited only by the claims that follow.

What is claimed:

1. A method for use in a system in which a plurality of content providers provide multiple resources to multiple clients, wherein each content provider provides at least some of its resources via one or more origin servers associated with that content provider, and wherein a web page of a content provider of said plurality of content providers includes at least one reference to a resource of said content provider, said reference comprising a first URL identifying said resource, said first URL including an original hostname associated with said content provider and a path, the original host name being an origin server name, the method comprising:
(A) providing a plurality of repeater servers distinct from said origin servers and configured to serve resources on behalf of the plurality of content providers;
(B) causing said first URL to be modified to produce a modified URL, said modified URL including at least a portion of said original hostname and a string of characters prepended to said at least portion of said original hostname, said string of characters being distinct from said original hostname, wherein at least some of said string of characters includes a repeater server name operable to cause the resource to be served to clients from at least one of the plurality of repeater servers instead of from an origin server associated with said content provider;
(C) a step for determining a Group Reduction Table and a Link Cost Table, wherein said Group Reduction Table and said Link Cost Table are operable for use in identifying the named repeater server; and
(D) providing, to said content provider, information related to the serving of at least the resource to clients by the at least one of the plurality of repeater servers.

2. A method as in claim 1 wherein at least some of said string of characters represent a new hostname distinct from said original hostname.

3. A method as in claim 2 wherein the original URL includes an original domain name and path and wherein the modified URL includes the new hostname prepended to the original domain name and path.

4. A method as in claim 3 wherein the resource is an embedded object.

5. A method as in claim 1 wherein at least some of the string of characters represent a fully qualified domain name.

6. A method as in claim 1 wherein the causing act comprises:
tagging the first URL using said string of characters.

7. A method as in claim 1 wherein the first URL has the form:
"http://<server>/<path>"
where "<server>" is the origin server name and where "<path>" is a path to the resource designated by the first URL, and wherein the modified URL has the form:
"http://<repeater>/<server>/<path>"
where "<repeater>" is the string of characters.

8. A method as in claim 1 wherein the first URL has the form:
"http://<server>/<path>"
where "<server>" is the origin server name and where "<path>" is a path to the resource designated by the URL, and wherein the modified URL has the form:
"http://<repeater>/<server>/<path>"
where "<repeater>" is a hostname.

9. A method as recited in claim 1, wherein the causing act comprises:
replacing the first URL in the web page with the modified URL.

10. A method as recited in claim 9, further comprising:
in response to a request for the web page by a client, obtaining the web page from an origin server associated with said content provider, and serving the web page to the client in response to performance of the replacing act.

11. A method as recited in claim 10, wherein the obtaining, serving and replacing acts are performed by a repeater server.

12. A method as recited in claim 9, wherein the original hostname is resolvable to an origin server associated with said content provider.

13. A method as recited in claim 1, further comprising:
responsive to each of the at least one repeater servers being requested to serve the resource to a client:
checking to determine whether a copy of the resource is available in a cache storage of the repeater server;
if a copy of the resource is available in the cache storage of the repeater server, serving the copy of the resource to the client from the cache storage of the repeater server; otherwise,
if a copy of the resource is not available in the cache storage of the repeater server, retrieving the resource from an origin server associated with the content provider prior to serving the resource to the client.

14. A method as recited in claim 13, wherein the retrieving act comprises:
using at least the portion of the original hostname in the modified URL to retrieve the resource from the origin server associated with said content provider.

15. A method as recited in claim 1, further comprising:
logging, by each of the plurality of repeater servers, information related to all resources served therefrom on behalf of said content provider, wherein said all resources includes the resource originally identified by the first URL.

16. A method as recited in claim 15, wherein the logged information comprises one or more time stamps corresponding to service of the resource by each of the at least one repeater servers that serves the resource to a client.

17. A method as recited in claim 15, further comprising:
merging the information logged by each of the plurality of repeater servers, wherein the providing act comprises providing the merged information to said content provider.

18. A method as recited in claim 1, further comprising:
(C) using information contained in the modified URL to identify said content provider in response to a client request.

19. A method as recited in claim 18, wherein the client request comprises an HTTP Request and the modified URL is contained in an HTTP header associated with the client request.

* * * * *